US011111034B2

(12) United States Patent
Thenander et al.

(10) Patent No.: US 11,111,034 B2
(45) Date of Patent: Sep. 7, 2021

(54) SEPARABLE ROLLER SCREW ASSEMBLY FOR A SPACE CRAFT RELEASE MECHANISM SYSTEM

(71) Applicant: RUAG SPACE AB, Gothenburg (SE)

(72) Inventors: Magnus Thenander, Linköping (SE); Johan Ohlin, Rimforsa (SE)

(73) Assignee: RUAG SPACE AB, Gothenburg (SE)

( * ) Notice: Subject to any disclaimer, the term of this patent is extended or adjusted under 35 U.S.C. 154(b) by 372 days.

(21) Appl. No.: 16/092,428

(22) PCT Filed: Apr. 25, 2016

(86) PCT No.: PCT/SE2016/050361
§ 371 (c)(1),
(2) Date: Oct. 9, 2018

(87) PCT Pub. No.: WO2017/188867
PCT Pub. Date: Nov. 2, 2017

(65) Prior Publication Data
US 2020/0324923 A1 Oct. 15, 2020

(51) Int. Cl.
*B64G 1/64* (2006.01)
*F16B 2/08* (2006.01)
*F16B 7/06* (2006.01)

(52) U.S. Cl.
CPC ............ *B64G 1/64* (2013.01); *B64G 1/641* (2013.01); *B64G 1/645* (2013.01); *F16B 2/08* (2013.01); *F16B 7/06* (2013.01)

(58) Field of Classification Search
CPC .......... B64G 1/64; B64G 1/641; B64G 1/645; F16B 2/08; F16B 7/06; F16B 35/042;
(Continued)

(56) References Cited

U.S. PATENT DOCUMENTS 2,683,379 A * 7/1954 Strandgren ......... F16H 25/2252
74/424.92
3,214,991 A * 11/1965 Perrin ................. F16H 25/2252
74/424.92
(Continued)

FOREIGN PATENT DOCUMENTS

GB 1021655 A 3/1966

OTHER PUBLICATIONS

International Search Report and Written Opinion for PCT/SE2016/050361, dated Jan. 12, 2017.

*Primary Examiner* — Medhat Badawi
*Assistant Examiner* — Vicente Rodriguez
(74) *Attorney, Agent, or Firm* — Crowell & Moring LLP; John C. Freeman

(57) ABSTRACT

The present disclosure relates to a separable roller screw assembly comprising: a first screw shaft having a first external thread and being axially separated from a second screw shaft having a second external thread; a planetary roller arrangement comprising multiple rotatable rollers radially arrayed about the first and second screw shafts, whilst being encapsulated by a rotatable nut module; the rotatable nut module being coaxially arranged about the first and second screw shafts and configured for maintaining the planetary roller arrangement, the first and second screw shafts in an axially fixed configuration to permit the assembly to carry a load in an axial direction corresponding to an axial tensile force, whilst enabling displacement of the first screw shaft relative to the second screw shaft when said assembly is released from said axially fixed configuration; and wherein each one of the multiple rollers comprises first and second roller external thread regions adapted to engage said first external thread and said second external thread, respectively. Moreover, the present disclosure relates to a space craft release mechanism for separating a first space (Continued)

craft element from a second space craft element and comprising a separable roller screw assembly. In addition, the present disclosure relates a clamp band system for a load bearing interface assembly of a space craft comprising a separable roller screw assembly.

20 Claims, 14 Drawing Sheets

(58) Field of Classification Search
CPC ...... F16B 2/065; F16B 23/00; F16B 23/0061; F16L 21/06; F16H 25/2266; F16H 25/24; F16H 25/2252; F16H 25/2261; F16H 2025/2252; F16H 2025/028; F16H 2025/2276; F16H 1/28; Y10S 411/919; F16G 11/12
See application file for complete search history.

(56) References Cited

U.S. PATENT DOCUMENTS

| | | | | |
|---|---|---|---|---|
| 4,715,565 | A * | 12/1987 | Wittmann | B64G 1/641 |
| | | | | 102/377 |
| 5,248,233 | A | 9/1993 | Webster | |
| 5,603,595 | A | 2/1997 | Nygren | |
| 6,076,467 | A * | 6/2000 | Cespedosa | B64G 1/641 |
| | | | | 102/377 |
| 6,454,214 | B1 * | 9/2002 | Smith | B64G 1/641 |
| | | | | 102/377 |
| 9,039,566 | B2 * | 5/2015 | Rudy | F16H 25/2252 |
| | | | | 475/331 |
| 2002/0102130 | A1 | 8/2002 | Nygren et al. | |
| 2005/0168084 | A1 * | 8/2005 | Tesar | H02K 7/06 |
| | | | | 310/80 |
| 2015/0176734 | A1 * | 6/2015 | Zivanovic | F16B 2/08 |
| | | | | 24/19 |

* cited by examiner

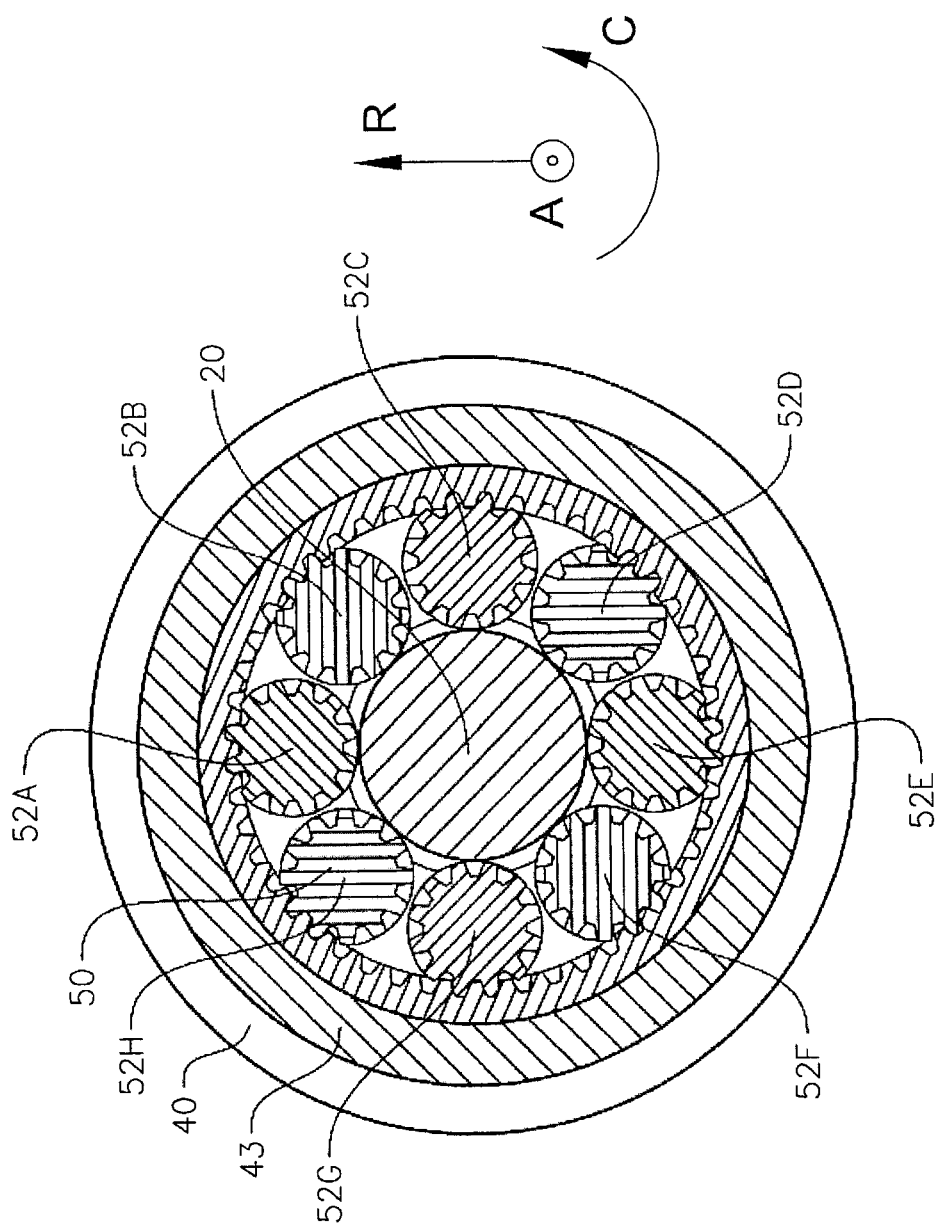
FIG. 3d A-A

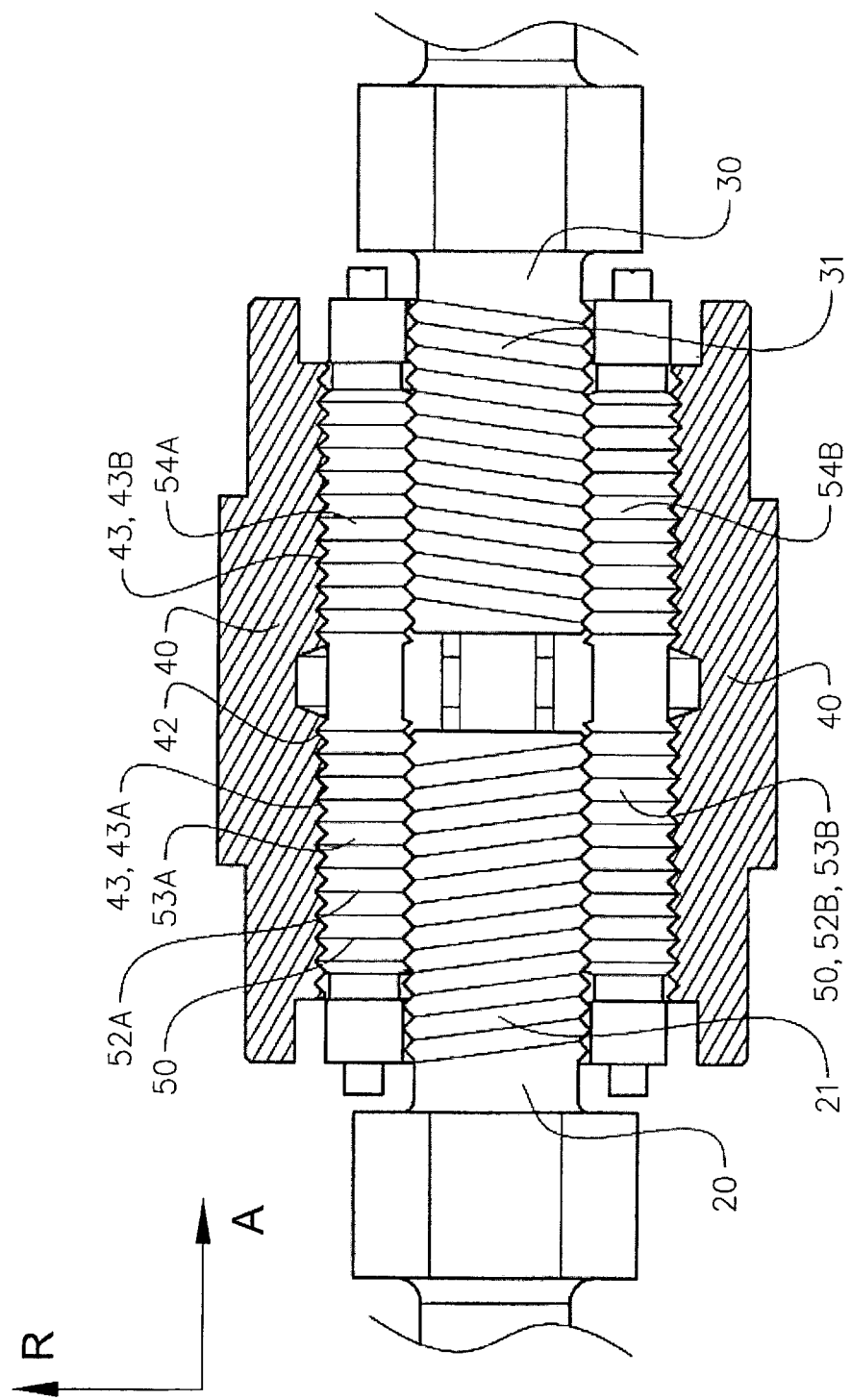

SEPARABLE ROLLER SCREW ASSEMBLY FOR A SPACE CRAFT RELEASE MECHANISM SYSTEM

RELATED APPLICATIONS

This application claims the benefit under 35 U.S.C. § 371 of the filing date of International Patent Application No. PCT/SE2016/050361, having an international filing date of Apr. 25, 2016, the content of which is incorporated herein by reference in its entirety.

TECHNICAL FIELD

This disclosure relates to a separable roller screw assembly comprising a planetary roller arrangement having multiple rotatable rollers radially arrayed about a first screw shaft and a second screw shaft, whilst being encapsulated by a rotatable nut module. The separable roller screw assembly may be incorporated in a space craft release mechanism, a clamp band system for a load bearing interface assembly and/or in number of spacecraft elements. The space craft element may be a satellite, launch vehicle, payload, launch vehicle adapter, payload adapter, a combination thereof and/or a plurality thereof. The disclosure also relates to a space craft release mechanism for separating a first space craft element from a second space craft element and comprising a separable roller screw assembly. Moreover, the disclosure relates to a clamp band system for a load bearing interface assembly of a space craft comprising a separable roller screw assembly. Furthermore, the disclosure relates to a load bearing interface assembly comprising a clamp band system and the separable roller screw assembly.

BACKGROUND

In the field of spaceflight and spacecraft, one common operational phase is the separation of a space craft element from another space craft element, e.g. the separation of a satellite from a launch vehicle at a desired point in time, e.g. on its way to the orbit or in the orbit. Typically, when the spacecraft includes a so-called multistage rocket, there is a number of separation events until the satellite is eventually separated from the last launch vehicle stage or payload adapter. Each separation event is complex and introduces additional risk into the success of the launch mission. By way of example, separation events may occur when the payload separates prior to orbital insertion, or when used, a launch vehicle separates after the early phase of a launch. There are, however, several different separation events during the journey to orbit or in the orbit.

In order to ensure a safe and controlled separation of two space craft elements, such as a separation between a launch vehicle and the satellite, the spacecraft may include a separation system. In addition, the separation system may often include pyrotechnic fasteners or pneumatic systems to initiate the separation of the space craft elements. A separation system of a spacecraft should not only offer a safe separation of spacecraft elements, but also ensure that e.g. satellite and launch vehicles remain securely attached to one another during the tough journey into space.

U.S. Pat. No. 6,454,214 B1 discloses one type of device for releasably connecting a first part and a second part of a spacecraft. This type of device comprises a clamp for providing a detachable connection between two craft parts in a space craft. The band parts of the clamp are held together by a band opening mechanism, which comprises two continuous fitting parts. Each fitting part of the band opening mechanism includes a threaded section and a connecting device comprising a threaded section being operable to engage the threaded sections of the two fitting parts.

Although this type of devices works well in some situations, there is still room for improvements relating to the separation of the space craft elements.

SUMMARY

The present disclosure relates to a separable roller screw assembly capable of improving the separation of space craft elements of a spacecraft in terms of increased control and reliability. In particular, the present disclosure relates to a separable roller screw assembly capable of more efficiently controlling the separation of space craft elements at a desired point in time, whilst ensuring that the separation still produces a relatively low shock and generates a relatively low level of disturbance with a high reliability. This is at least partly achieved by the features of claim 1.

The disclosure concerns a separable roller screw assembly comprises:
  a first screw shaft having a first external thread and being axially separated from a second screw shaft having a second external thread,
  a planetary roller arrangement comprising multiple rotatable rollers radially arrayed about the first screw shaft and the second screw shaft, whilst being encapsulated by a rotatable nut module, and wherein each one of the multiple rollers comprises first and second roller external thread regions adapted to engage the first external thread and the second external thread, respectively,
  the rotatable nut module being coaxially arranged about the first screw shaft and the second screw shaft and configured for maintaining the planetary roller arrangement, the first screw shaft and the second screw shaft in an axially fixed configuration to permit the separable roller screw assembly to carry a load in an axial direction corresponding to an axial tensile force, whilst enabling displacement of the first screw shaft relative to the second screw shaft when said separable roller screw assembly is released from the axially fixed configuration, and
  wherein, when the separable roller screw assembly is released from the axially fixed configuration and subjected to the axial tensile force, the first screw shaft is permitted to displace axially from the second screw shaft via rotation of the planetary roller arrangement about the first and second screw shafts.

Accordingly, the assembly is configured to be in a so called locked mode (corresponding to the axially fixed configuration), in which parts of the assembly are prevented from being axially displaced relative each other (thus carrying a load in the axial direction), and in an unlocked mode, in which the first screw shaft of the assembly is permitted to axially displace relative the second screw shaft.

In this manner, there is provided a separable roller screw assembly which is capable of storing kinetic energy due to that the components of the assembly rotate when the assembly is released from the axially fixed configuration, as further described below.

Further, by the above configuration of the separable roller screw assembly, the components of the assembly are configured to interact with rolling friction between the components, thus increasing reliability and reducing energy losses.

In this manner, it becomes possible to control the frictional losses within the assembly in a better way compared to hitherto known solutions.

The separable roller screw assembly according to the example embodiments herein is particularly useful as a space craft release mechanism. In addition, the separable roller screw assembly is particularly suitable for separation of one space craft element from another space craft element. As should be readily understood by the above configuration including the rotatable nut module, the first and second screw shafts and the planetary roller arrangement, the components of the assembly of the example embodiments are configured to essentially interact by means of rolling friction, sometimes called rolling resistance or rolling drag. In other words, the components of the example embodiments of the disclosure interact by means of rolling friction in a similar manner as a conventional planetary roller screw, which is a well-known type of configuration and thus not further described herein.

Accordingly, in the example embodiments, the rotatable nut module and the multiple rollers of the planetary roller arrangement are configured to rotate when the assembly is released from the axially fixed configuration. Thereby, the first screw shaft can be axially displaced from the second screw shaft at least until the first screw shaft is separated from any one of the rotatable nut module and the planetary roller arrangement. In this manner, the separation operation can be more controlled so that separation between various space craft elements connected by means of the assembly is further improved in terms of control and reliability.

Furthermore, it should be readily appreciated that then when the separable roller screw assembly is released from the first axially fixed configuration and subjected to the axial tensile force, the first screw shaft is permitted to displace axially from the second screw shaft via rotation of the planetary roller arrangement about the first and second screw shafts and via rotation of the rotatable nut module. That is, when the rotatable nut module is permitted to rotate, the first screw shaft is axially displaced from the second screw shaft via rotation of the rotatable nut module about the planetary roller arrangement and rotation of the planetary roller arrangement about the first and second screw shafts. In this context, the planetary roller arrangement and the rotatable nut module are configured to be non-displaceable in the axial direction. That is, the planetary roller arrangement and the rotatable nut module are configured to be non-displaceable in the axial direction upon rotation of the components of the assembly.

Further advantages and advantageous features of the example embodiments of the disclosure are disclosed in the following description and in the dependent claims.

It is also to be noted that when the first screw shaft and the second screw shaft are in the axially fixed configuration, the separable roller screw assembly may typically be further permitted to carry a load in a radial direction corresponding to a bending moment. Thus, in some example embodiments, the separable roller screw assembly is permitted to both carry a load in the axial direction and a load in the radial direction. In this context, it is also to be noted that the load distribution may vary due to environmentally induced loads such as vibrations, thermal loads and/or other external loads.

When the first screw is axially displaced relative to the second screw shaft to a certain distance, the first screw shaft is ultimately separated from the any one of the rotatable nut module and the planetary roller arrangement.

Thus, the first screw shaft is typically axially displaced from the second screw shaft at least until the first screw shaft is separated from any one of the rotatable nut module and the planetary roller arrangement.

Typically, although not strictly required, the first screw shaft is axially displaced from the second screw shaft at least until the first screw shaft is separated from both the rotatable nut module and the planetary roller arrangement. Thus, the first screw shaft is axially displaceable from the second screw shaft at least until the first screw shaft is separated from both the rotatable nut module and the planetary roller arrangement According to an example embodiment of the disclosure, both the first screw shaft and the second screw shaft are axially displaceable relative to the rotatable nut module and the planetary roller arrangement.

Typically, although not strictly required, the first screw shaft and the second screw shaft may be axially displaced relative to the rotatable nut module at least until the first shaft and the second shaft are separated from the rotatable nut module and the planetary roller arrangement.

According to an example embodiment of the disclosure, the second screw shaft remains essentially axially non-displaceable relative to the rotatable nut module and the planetary roller arrangement.

The rotatable nut module may be provided in several different configurations. According to an example embodiment, the rotatable nut module comprises an internal surface adapted for engaging the external thread regions of the multiple rollers. In this example, the internal surface typically comprises an internal thread region adapted for engaging the external thread regions of the multiple rollers. An internal thread region permits the assembly to carry more axial load compared to a non-threaded region since the load is shared between the rollers of the planetary roller arrangement and the rotatable nut module.

According to some design variants, the internal surface may be an essentially flat surface adapted for engaging the crest of the external thread regions of the multiple rollers. By having a rotatable nut module with an inner flat surface, the manufacturing of the rotatable nut module, and thus the assembly, can be kept relatively simple.

According to an example embodiment, the rotatable nut module is configured for maintaining the planetary roller arrangement, the first screw shaft and the second screw shaft in the axially fixed configuration by a locking mechanism. The locking mechanism is thus configured to prevent the first screw shaft, the second screw shaft, the planetary roller arrangement and the rotatable nut module to rotate relative each other. Thus, the assembly is fixed in the axially fixed configuration as mentioned herein. It is to be noted that due to the configuration of the assembly, and the provision that the locking mechanism is configured to prevent rotation of the components, as mentioned above, also an axial displacement of the first screw shaft and an axial displacement of the second screw shaft are prevented.

Typically, the locking mechanism is arranged in the assembly to prevent rotation of the rotatable nut module. Accordingly, as the rotatable nut module is arranged to engage the planetary roller arrangement and also arranged to indirectly interact with the first screw shaft and the second screw shaft via the planetary roller arrangement, it will be readily understood that the planetary roller arrangement and the first and second screw shafts are prevented from rotation by the configuration and arrangement of the rotatable nut module and the locking mechanism when the assembly is in the axially fixed configuration.

To this end, the locking mechanism is configured to release the separable roller screw assembly from the axially fixed configuration. By way of example, the locking mechanism is configured to release the separable roller screw assembly from the axially fixed configuration upon a manipulation by a user. The locking mechanism can be set to release the separable roller screw assembly from the axially fixed configuration at a point in time decided by the user. However, the locking mechanism can be configured to release the separable roller screw assembly from the axially fixed configuration in other ways.

With regards to the external threads of the shafts, the external thread regions of the multiple rollers and also with the optional choice of providing the rotatable nut module with an inner thread region, it should be readily appreciated that several different design variants are possible in order to provide the example advantages as mentioned above. In general, any thread combination, i.e. left-, right-handed or a "zero thread" may be chosen on the two shafts, the rollers and/or the rotatable nut module. Different combinations of threads will give a different gear ratio of the axial displacement versus the rotation of the rollers and rotatable nut module. Some combinations of threads will give a symmetrical mechanism, and some will give a non-symmetrical mechanism. In addition, it should be readily appreciated that any gear ratio may be obtained by choosing a certain combination of the directions of the threads and an appropriate pitch for the given purpose of the example embodiments of the disclosure.

According to an example embodiment when the rotatable nut module is provided with the internal thread, the thread regions of the rollers and the rotatable nut module inner thread should match so that there is no relative axial displacement between the rollers and the rotatable nut module when they are rotating.

The term "thread" typically refers to a ridge or groove that winds around the component. Furthermore, a thread can be defined by its thread profile, i.e. each thread and/or thread region is defined by a thread profile. The term "thread profile" refers to the cross-sectional shape, angle and pitch formed by the thread(s) of a given component of the assembly. In various implementations of the example embodiments of the assembly, various thread profiles may be used for the threads of the first screw shaft and the second screw shaft, the optional internal thread of the rotatable nut module as well as for the thread regions of each roller of the planetary roller arrangement. The shape of the thread profile for a given thread and/or thread region is typically selected depending on the type of installation and type of use of the assembly. In some examples, the thread is a helical ridge with a pitch. The pitch of a helix is the width of one complete helix turn as measured parallel to the axis of the helix. Helices can be either right-handed or left-handed.

It is also conceivable that the component may comprise a number of threads such as two congruent helices with the same axis, differing by a translation along the axis. Typically, the two congruent helices may have the same pitch.

In other examples, the thread is provided with no pitch, i.e. the thread is a groove with "zero pitch". In these types of examples, the component typically comprises a plurality of spaced apart threads. In other words, the component in this example comprises a plurality of spaced apart threads with no pitch being distributed along an axial direction of the component. The component as mentioned above may refer to any one of the first screw shaft, the second screw shaft, the roller(s) of the planetary roller arrangement and/or the rotatable nut module.

In other words, the first external thread of the first screw shaft can be a right-handed thread, a left-handed thread or a groove with zero pitch. If the thread is a groove with zero pitch, the first screw shaft generally comprises a number of first external threads defined as grooves with no pitch, and being arranged spaced apart along the axial direction of the first screw shaft.

Analogously, the second external thread of the second screw shaft can be a right-handed thread, a left-handed thread or a groove with zero pitch. If the thread is a groove with zero pitch, the second screw shaft generally comprises a number of second external threads defined as grooves with no pitch, and being arranged spaced apart along the axial direction of the second screw shaft.

The first external thread region of a roller of the multiple rollers is adapted to engage the first external thread of the first screw shaft. The first roller external thread region of a roller can be a right-handed thread, a left-handed thread or a groove with zero pitch.

Analogously, the second external thread region of said roller of the multiple rollers is adapted to engage the second external thread of the second screw shaft. The second roller external thread region of a roller can be a right-handed thread, a left-handed thread or a groove with zero pitch.

According to an example embodiment, the first and/or second roller external thread regions of each one of the multiple rollers extend along the roller to form a continuous external thread section. In this manner, the planetary roller arrangement and the assembly is easier to manufacture. In addition, it becomes possible to make the assembly more compact. When the first roller external thread region of a roller of the multiple rollers and the second roller external thread region of said roller of the multiple rollers form a continuous external thread section, said continuous external thread section may have a left-handed external thread, a right-handed thread, or a groove with zero pitch.

Furthermore, when the rotatable nut module comprises the internal thread region, the internal thread region may have a left-handed internal thread, a right-handed internal thread, or a groove with zero pitch.

According to an example embodiment, the internal thread of the rotatable nut module forms a continuous internal thread section. In this manner, the planetary roller arrangement and the assembly is easier to manufacture. In addition, it becomes possible to make the assembly more compact.

The disclosure also relates to a space craft release mechanism for separating a first space craft element from a second space craft element. The space craft release mechanism comprises a separable roller screw assembly according to any one of the example embodiments as mentioned above with respect to the separable roller screw assembly. As mentioned herein, the space craft element can be any one of a satellite, launch vehicle, launch vehicle stage, payload, launch vehicle adapter, payload adapter, fairing a combination thereof and/or a plurality thereof.

Typically, the space craft release mechanism is further adapted to connect to the first space craft element and the second space craft element, whereby, when the first shaft is axially displaced from the second shaft until the first shaft is separated from any one of the rotatable nut module and the planetary roller arrangement, the first space craft element is separated from the second space craft element.

Typically, the first shaft is connectable to a first space craft element and the second shaft is connectable to a second space craft element.

The disclosure also relates to a clamp band system for a load bearing interface assembly of a spacecraft, which comprises a separable roller screw assembly according to any one of the example embodiments as mentioned above with respect to the separable roller screw assembly.

According to an example embodiment, the clamp band system further comprises a first end part connected to a second end part via the separable roller screw assembly, wherein the first end part is expanded from the second end part when the first screw shaft of the separable roller screw assembly is axially displaced from the second screw shaft of the separable roller screw assembly.

The disclosure also relates to a load bearing interface assembly, which comprises a clamp band system according to any one of the example embodiments as mentioned above with respect to clamp band system and/or the separable roller screw assembly. Typically, the load bearing interface assembly is arranged between a first space craft element and a second space craft element.

According to an example embodiment, the clamp band system is arranged to extend about said load bearing interface assembly.

Further features of, and advantages with, the disclosure will become apparent when studying the appended claims and the following description. The skilled person realize that different features of the disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which:

FIG. 3b is an exploded view of the example embodiment of parts of the separable roller screw assembly in FIG. 3a;

FIG. 3d is a cross-sectional side view of the example embodiment of parts of the separable roller screw assembly in e.g. FIG. 3a;

FIG. 4 is a cross-sectional view along an axial direction of another example embodiment of parts of the separable roller screw assembly according to the disclosure;

DETAILED DESCRIPTION OF EXAMPLE EMBODIMENTS

Figure 1B:
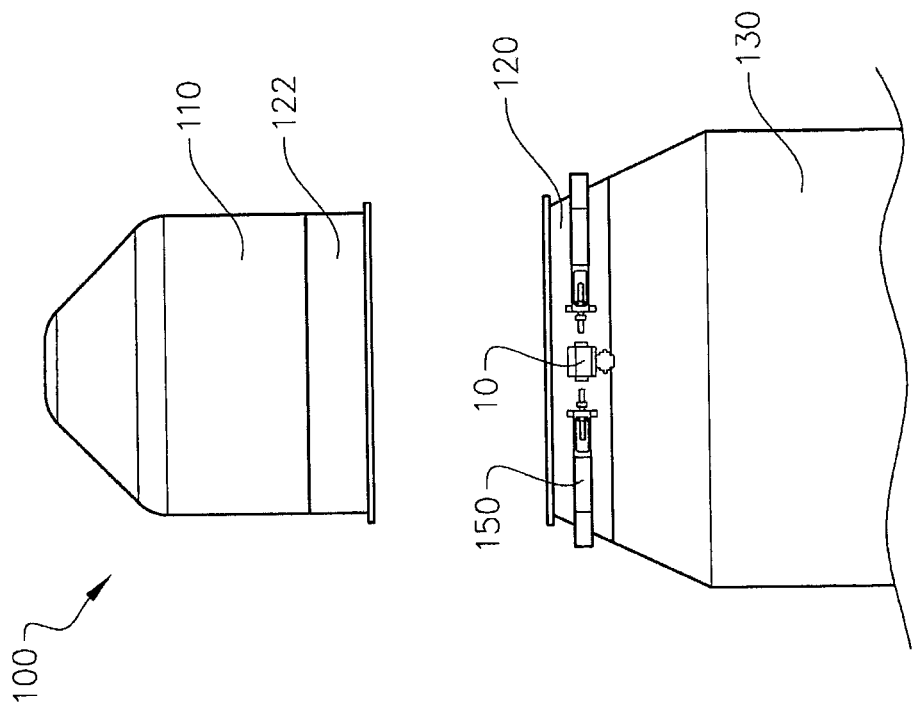
FIG. 1b is a side view of the first example embodiment in FIG. 1a according to the disclosure, in which a first spacecraft element is separated from a second spacecraft element after an expansion of the clamp band system due to a separation of part(s) of the separable roller screw assembly FIG. 2a schematically illustrates a top view of an example embodiment of parts of a clamp band system comprising a separable roller screw assembly according to the disclosure.

The present disclosure will now be described more fully hereinafter with reference to the accompanying drawings, in which example embodiments of the disclosure are shown. The disclosure may, however, be embodied in many different forms and should not be construed as limited to the example embodiments set forth herein; rather, these embodiments are provided for thoroughness and completeness. Like reference characters refer to like elements throughout the description.

Figure 1A:
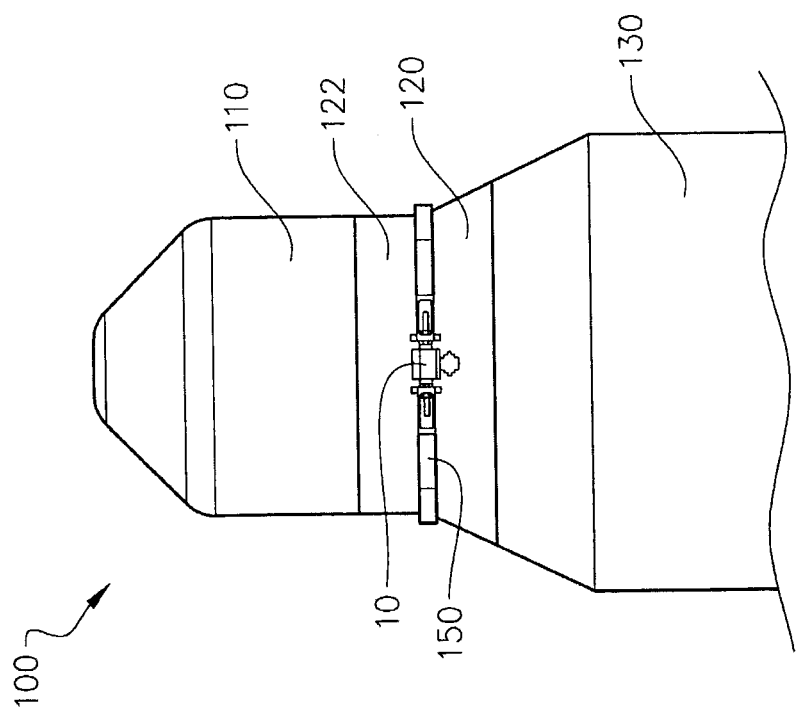
FIG. 1a is a side view of a first example embodiment of a spacecraft provided with a clamp band comprising a separable roller screw assembly according to the disclosure, in which the spacecraft and the clamp band system is in an assembled configuration and the separable roller screw assembly is in an axially fixed configuration.

For purposes of description herein the terms "upper," "lower," "axial," "radial," "circumferential," and derivatives thereof relate to the example embodiment of the disclosure as oriented in e.g. FIG. 1a. However, it is to be understood that the example embodiments may assume various alternative orientations, except where expressly specified to the contrary. It is also to be understood that the examples illustrated in the attached drawings, and described in the following specification are simply exemplary embodiments. Hence, dimensions and other physical characteristics relating to the embodiments disclosed herein are not to be considered as limiting, unless the appended claims expressly state otherwise.

The term "space craft element" as used herein may refer to a satellite, launch vehicle, launch vehicle stage, payload, launch vehicle adapter, payload adapter, fairing a combination thereof and/or a plurality thereof.

The term "axially fixed configuration" as used herein typically refers to a state of the separable roller screw assembly according to example embodiments, in which the parts of the separable roller screw assembly are axially fixed in relation to each other in order to permit the separable roller screw assembly to carry a load in an axial direction corresponding to an axial tensile force. This may refer to that the assembly is in a "locked mode". In the axially fixed configuration of the assembly, the rotatable nut module, the planetary roller arrangement, the first screw shaft and the second screw shaft are restricted from rotating relative each other, thus being restricted from moving axially relative each other. As will be readily appreciated from the disclosure of the example embodiments, the assembly can be maintained in the axially fixed configuration in several different ways. By way of example only, the rotatable nut module can be configured for maintaining the planetary roller arrangement, the first screw shaft and the second screw shaft of the assembly in the axially fixed configuration by a locking mechanism, which is arranged to prevent the first screw shaft, the second screw shaft, the planetary roller arrangement and the rotatable nut module to rotate relative each other. Upon release of the assembly from the axially fixed configuration, the first screw shaft is allowed to axially displace relative the second screw shaft when being subjected to an axial tensile force. This may refer to that the assembly is in an "unlocked mode". By way of example only, the release of the assembly from the axially fixed configuration is effectuated by a release of the locking mechanism. Accordingly, the assembly is configured to be in a locked mode (the axially fixed configuration), in which parts of the assembly are prevented from being axially displaced, and in an unlocked mode, in which the first screw shaft of the assembly is permitted to axially displace relative the second screw shaft.

In FIGS. 1a-1b, an example of a spacecraft 100 is depicted. The spacecraft here comprises a first space craft element 110 and a second spacecraft element 130. In this example, the first space craft element 110 is a satellite and the second space craft element 130 is a launch vehicle adapter. However, the space craft element may likewise be a launch vehicle, payload, payload adapter, a combination thereof and/or a plurality thereof as mentioned above. In addition, the launch vehicle adapter may be connected to another space craft element such as launch vehicle or another payload. As the components and characteristics of a spacecraft and the space craft elements are well-known in the art, no further details are described herein.

In this example embodiment, the spacecraft also includes a first load bearing interface assembly 120 and a second load bearing interface assembly 122. However, in some examples, the spacecraft may only include one load bearing interface assembly. The load bearing interface assembly may either be connected to a spacecraft element or regarded as a part of a spacecraft element. In other words, the load bearing interface assembly 120 may either be a separate part of a spacecraft or an integral part of a spacecraft element. In the example as shown in FIG. 1a, the load bearing interface assembly 120 is a part of the launch vehicle adapter, i.e. the second spacecraft element 130. Hence, the second spacecraft element comprises the load bearing interface assembly 120. Analogously, the load bearing interface assembly 122 in this example is part of the satellite, i.e. the first spacecraft element 110. Hence, the first spacecraft element comprises the load bearing interface assembly 122. Furthermore, the first spacecraft element 110 and the second spacecraft element 130 are connected via the load bearing interface assemblies 120 and 122.

Figure 2A:
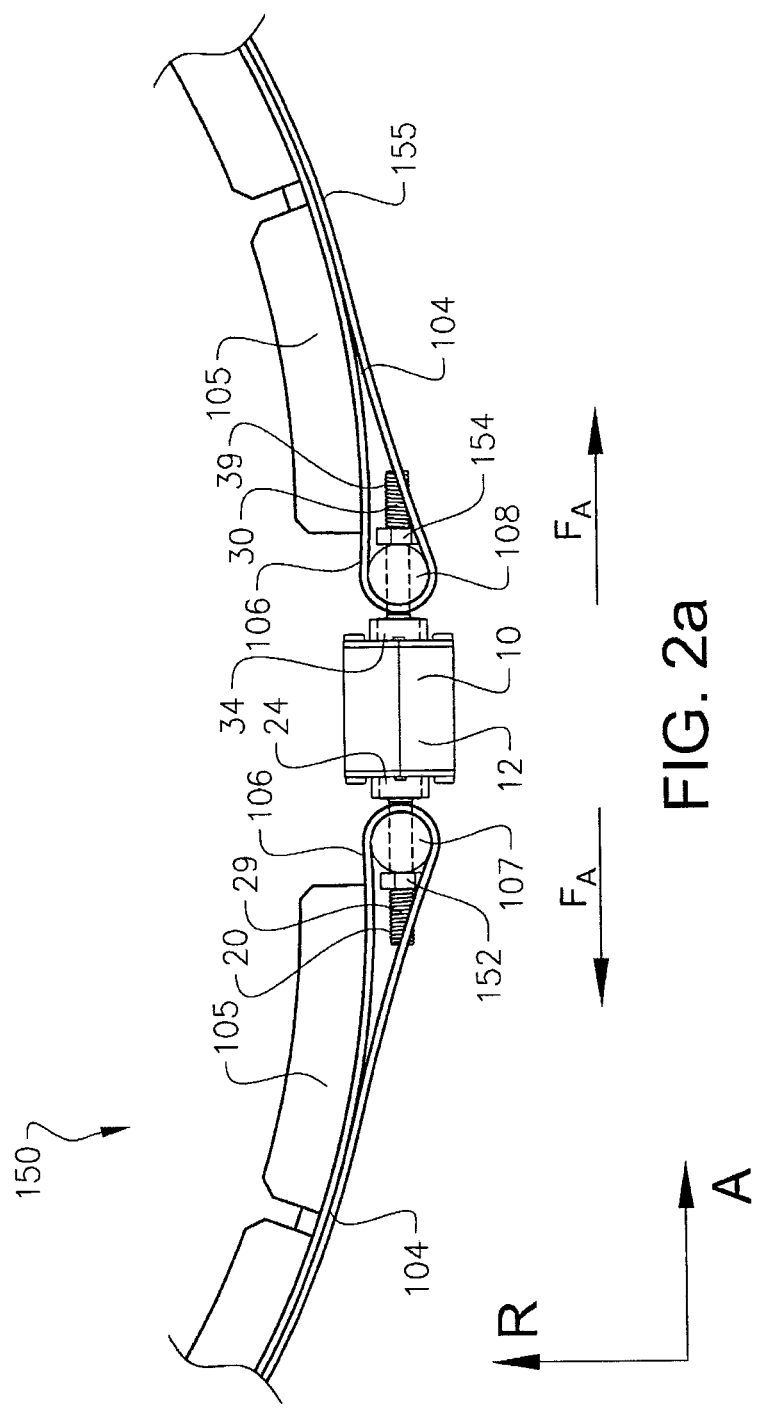
FIG. 2b is a perspective view of the example embodiment of parts of the clamp band system in FIG. 2a, in which the clamp band system comprises the separable roller screw assembly according to the disclosure.
Figure 2B:
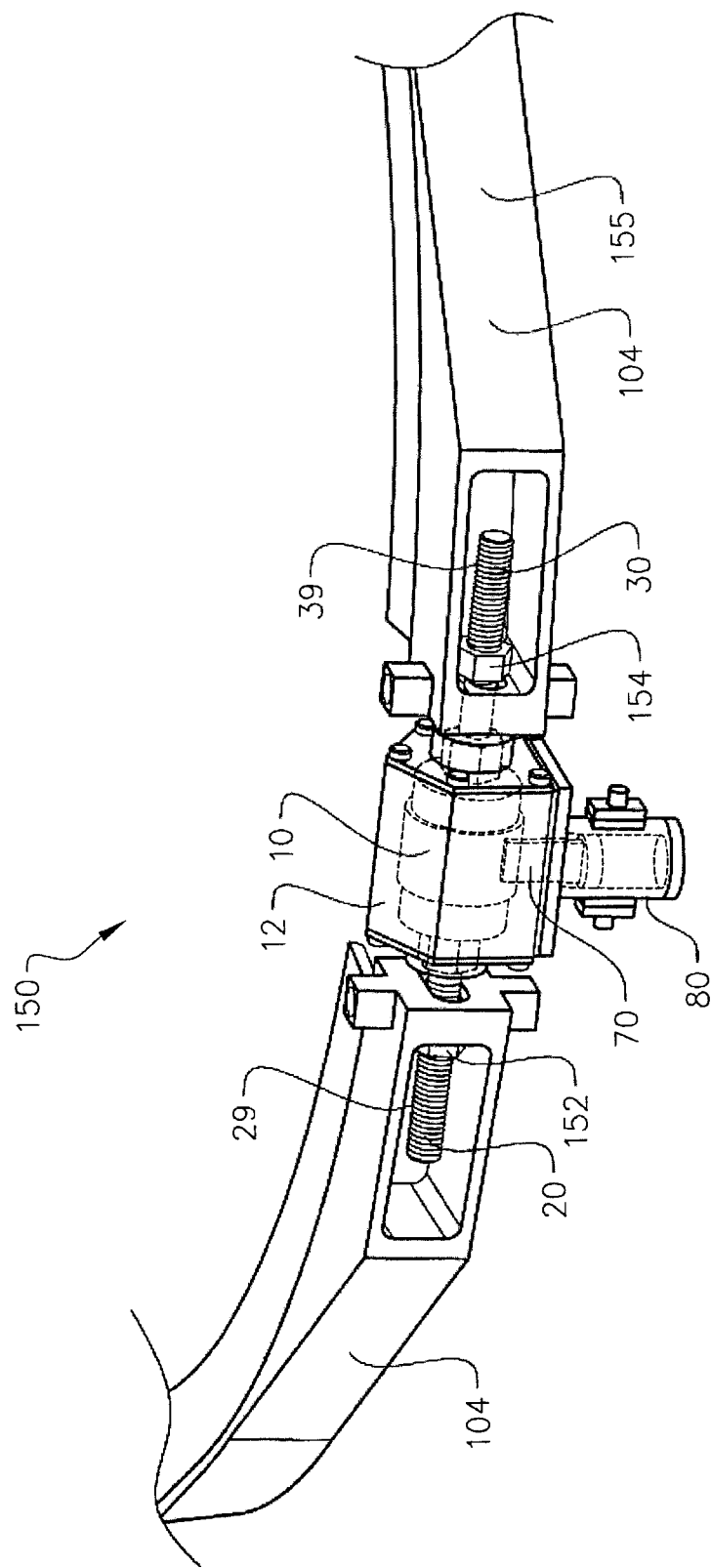

Moreover, the load bearing interface assembly 120 comprises a clamp band system 150, as shown in FIGS. 1a-1b and in more detail in FIGS. 2a-2b. The clamp band system 150 is configured for providing a detachable connection between two spacecraft elements of a spacecraft. As shown in FIG. 1a, the clamp band system 150 is arranged to extend about the load bearing interface assembly 120. The clamp band system also comprises a separable roller screw assembly 10 according to example embodiments of the disclosure. The clamp band system comprising the separable roller screw assembly 10 is further described in conjunction with FIGS. 2a-2b, whilst the separable roller screw assembly is described in detail in conjunction with FIGS. 3a-5 hereinafter.

In this context, a clamp band system comprising the separable roller screw assembly may sometimes generally refer to a space craft release mechanism system. However, for sake of simplicity, the description herein typically denotes the system as a clamp band system comprising the space craft release mechanism. The space craft release mechanism is configured for separating the first space craft element from the second space craft element, by means of the components of the separable roller screw assembly. In other words, the clamp band system is here a system having a space craft release mechanism configured for separating the first space craft element from the second space craft element by means of the separable roller screw assembly. However, it should be noted that the separable roller screw assembly may be incorporated in other types of space craft release mechanisms and/or in other design variants of a spacecraft or space craft elements. In some example embodiments, as shown in e.g. FIG. 6, the separable roller screw assembly is the space craft release mechanism. For the sake of simplicity, however, the space craft release mechanism in FIGS. 1a-1b and 2a-2b is described in connection to a clamp band system comprising the separable roller screw assembly, and the following example embodiment is described on an exemplary clamp band system to illustrate the configuration of the separable roller screw assembly. Thus, the space craft release mechanism may be installed in various spacecraft applications. In addition, or alternatively, the space craft release mechanism is intended to be operatively connected to a spacecraft element in several different ways.

Turning now to FIG. 1a, the spacecraft and the clamp band system are illustrated in an assembled configuration and the separable roller screw assembly is in an axially fixed configuration, whilst FIG. 1b schematically shows the spacecraft 100 in a separated state, in which the first spacecraft element (satellite) 110, the second spacecraft element (payload adapter) 130 are separated from each other. Moreover, in FIG. 1b, the clamp band system 150 is in an extended state although still at least partly encircling the load bearing interface assembly 120 of the of the second space craft element 130 (the payload adapter). That is, the clamp band system 150 has moved away from the load bearing interface assembly, whilst still being attached to the payload adapter 130. Further, as may be gleaned from FIG. 1b, parts of the separable roller screw assembly 10 are here released from both sides of the clamp band system 150. The release of parts of the separable roller screw assembly from the clamp band system will be described in more details in conjunction with FIGS. 2a-5. Typically, the clamp band system 150 comprises the separable roller screw assembly 10 and a clamp band structure 155. In other words, FIG. 1b is a side view of the first example embodiment in FIG. 1a according to the disclosure, in which the first spacecraft element 110 is separated from the second spacecraft element 130 after an expansion of the clamp band system 150 due to a separation of part(s) of the separable roller screw assembly 10.

To this end, the clamp band system 150 is held together by the separable roller screw assembly 10 when the separable roller screw assembly 10 is in the axially fixed configuration, as shown in FIG. 1a. As mentioned above, the axially fixed configuration refers to a state of the separable roller screw assembly 10 when the parts of the separable roller screw assembly 10 are axially fixed in relation to each other in order to permit the separable roller screw assembly to carry a load in an axial direction A corresponding to an axial tensile force $F_A$, as shown in e.g. FIG. 2a. When at least one part of the separable roller screw assembly 10 is released from the other parts of the separable roller screw assembly 10, as shown in FIG. 1b, the first spacecraft element 110 is capable of separating from the second spacecraft element 130 upon expansion of the clamp band system 150.

A clamp band system 150 including the separable roller screw assembly 10 is schematically shown in FIGS. 2a-2b. The clamp band system is suitable for a load bearing interface assembly of a space craft element. Typically, the load bearing interface assembly comprises the clamp band system, wherein the load bearing interface assembly is arranged between the first space craft element and the second space craft element. However, the clamp band system may also be a separate part connected to the load bearing interface assembly. By way of example, the clamp band system is arranged to extend about the load bearing interface assembly.

FIG. 2a schematically illustrates a top view of an example embodiment of parts of a clamp band system that comprises the separable roller screw assembly according to the disclosure, whilst FIG. 2b is a perspective view of the example embodiment of parts of the clamp band system in FIG. 2a, in which the clamp band system comprises the separable roller screw assembly according to the disclosure. Thus, referring now to FIGS. 2a and 2b, further details of the clamp band system and its configuration are depicted when arranged to extend about the load bearing interface assembly 120. The clamp band system 150, or sometimes simply denoted as the clamp, comprises a clamp band structure 155 having a band 104 and a number of shoes 105. The shoes 105 are configured to bear on the cylindrical structural parts of load bearing interface assembly and are held in place by means of the band 104. The band is typically fastened with a pre-load (or pre-stress) about the number of shoes 105 so that they exert compressive forces on the structural parts of the load bearing interface assembly. Due to the pre-load fastening of the clamp band system about the load bearing interface assembly, the clamp band system is arranged to ensure that the satellite 110 and payload adapter 130 remain securely attached to one another during the tough journey into space (as shown in e.g. FIG. 1a).

By way of example, the clamp band 104 can be made of a relatively flexible material. In addition, or alternatively, the clamp band can be made of a number of arc-shaped connected parts which together form a circular clamp band around the load bearing interface assembly.

The clamp band structure 155 in this example has a first end part 107 and a second end part 108. The first end part 107 is connected to the second end part 108 via the separable roller screw assembly 10. That is, the first end part 107 is connected to the second end part 108 via the separable roller screw assembly 10 in a configuration when the clamp band system is held together by the separable roller screw assembly 10, as shown in FIG. 2a. Further, in this example embodiment, the first end part 107 is connected to a first screw shaft 20 of the separable roller screw assembly 10 and the second end part 108 is connected to the second screw shaft 30 of the separable roller screw assembly 10. As such, as will be further described hereinafter, the first end part of the clamp band system is expanded from the second end part of the clamp band system when the first screw shaft of the separable roller screw assembly is axially displaced from the second screw shaft of the separable roller screw assembly. In this context, the term axially displaced refers to a movement in the axial direction A, as shown in FIG. 2a and/or FIG. 3a.

In the example in the FIGS. 2a-2b, both first and second end parts 107 and 108 of the clamp band system 150 are arranged in loops 106 and are held together by the separable roller screw assembly 10. It is to be noted that other design variants of the clamp band system ends are conceivable as long as they can be held together by the separable roller screw assembly 10.

The clamp band system 150 also comprises the separable roller screw assembly 10. In this example, as shown in e.g. FIGS. 2a and 2b, the separable roller screw assembly is contained in a housing 12. As mentioned above, and which is further described hereinafter in relation to FIGS. 3a-4, the separable roller screw assembly 10 is configured for allowing the first end part 107 to expand from the second end part 108 when the first shaft 20 of the separable roller screw assembly is axially displaced from the second shaft 30 of the separable roller screw assembly. When the clamp band system expands, the load bearing interface assembly 122 is set free from the load bearing interface assembly 120, thus the first space craft element 110 and the second space craft element 130 typically start to move away from each other (separate) due to forces from pre-stressed springs arranged on any one of the space craft elements. The pre-stressed springs are adapted to push the space craft elements apart until they are completely separated from each other, as shown in FIG. 1b.

The detachable connection between parts of the clamp band structure 155 and the separable roller screw assembly 10 can be provided in several different ways.

In FIGS. 2a and 2b, the separable roller screw assembly 10 comprises the first screw shaft 20 and the second screw shaft 30. Each one of the first screw shaft 20 and the second screw shaft 30 is provided with corresponding threaded sections 29 and 39. The threaded section 29 forms a fitting part configured for connecting to the first end part 107, whilst the threaded section 39 forms another fitting part configured for connecting to the second end part 108. Typically, although not strictly required, each one of the first screw shaft 20 and the second screw shaft 30 are attached to the first end part 107 and the second end part 108, respectively, by locking nuts 152 and 154. Accordingly, prior to use of the clamp band system and the separable roller screw assembly, the separable roller screw assembly 10 is connected to the clamp band structure 155 by inserting the threaded section 29 of the first screw shaft 20 into an opening of the first end part 107 of the clamp band structure and subsequently threading the locking nut 152 on the threaded section 29 of the first screw shaft 20 and then inserting the threaded section 39 of the second screw shaft 30 into an opening of the second end part 108 of the clamp band structure and subsequently threading the locking nut 154 on the threaded section 39 of the second screw shaft 30 until the clamp band system is tensioned around the load bearing interface assembly 120 with a certain pre-load. In this manner, the spacecraft elements 110 and 130 can be connected to each other from assembly of the spacecraft to separation of the space craft elements by a release of the separable roller screw assembly. That is, after assembly of the spacecraft, the spacecraft elements 110 and 130 are connected to each other until the separable roller screw assembly 10 is controlled to axially displace and separate the first screw shaft 20 from the second screw shaft 30 in order to expand the first end part 107 of the clamp band from the second end part 108.

The separable roller screw assembly 10 should at least be tightened to the clamp band structure 155 to a certain level in order to ensure that the clamp band system is sufficiently fastened around the load bearing surface assembly 120 and/or 122 to safeguard that the satellite 110 and payload adapter 130 remain securely attached to one another during the journey to space.

Due to fastening of the separable roller screw assembly 10 to the clamp band structure 155, there is a prestress-produced tensile force in the axial direction A, exerted on the first screw shaft 20 and the second screw shaft 30 of the separable roller screw assembly 10. Accordingly, when the separable roller screw assembly is released from the axially fixed configuration and subjected to the axial tensile force $F_A$, the first screw shaft 20 is permitted to displace axially from the second screw shaft 30 via rotation of a planetary roller arrangement and a rotatable nut module of the separable roller screw assembly, as will be further described in relation to FIGS. 3a-4 hereinafter. A typical value on a suitable axial tensile force may be about 40-70 kN. However, other values or value ranges are conceivable.

In other words, the separable roller screw assembly is set into a pre-loaded configuration with the clamp band structure. That is, the clamp band system comprising the separable roller screw assembly is set into a pre-loaded configuration.

When the separable roller screw assembly is released from the axially fixed configuration, the axial tensile force induces the first screw shaft 20 and the second screw shaft 30 to axially displace relative each other. In order to lock the engagement of the separable roller screw assembly 10 in the axially fixed configuration, the separable roller screw assembly 10 is typically configured to remain non-rotatable in relation to the clamp band structure and the clamp band system 150.

By way of example, the separable roller screw assembly 10 is typically configured to remain non-rotatable in relation to the clamp band structure and the clamp band system 150 by a locking arrangement. The locking arrangement can be configured in several different ways. In one example, as shown in FIGS. 2a-2b and FIGS. 3a-3c, the locking arrangement is provided by the housing 12, a set of rotational stop units 24 and 34 and the locking mechanism 70. In this example, each rotational stop unit is part of the first screw shaft and the second screw shaft. Further, each one of the rotational stop units 24 and 34 is accommodated in a corresponding recess in the housing, recess 12a and recess 12b in FIG. 3b. Thus, the housing 12 comprises a set of recesses 12a and 12b arranged on opposite sides of the housing, as seen in the axial direction A. Each one of the recesses 12a and 12b is configured for accommodating a rotational stop unit. The locking arrangement is configured to maintain the separable roller screw assembly 10 in the axially fixed configuration, i.e. in the non-rotatable state relative the clamp band structure and the clamp band system, until the locking arrangement is released from its locking state, e.g. by a blasting charge module 80, which is further described hereinafter.

In other words, the first screw shaft and the second screw shaft comprises first rotational stop unit and second rotational stop unit, respectively, and said separable roller screw assembly further comprises a housing having first and second recesses arranged on opposite sides of the housing, as seen in the axial direction A. In addition, the recesses are here configured for accommodating the first and second rotational stop units, respectively, whereby the locking arrangement is formed by the housing, the set of first and second rotational stop units and the locking mechanism to enable the separable roller screw assembly to maintain the axially fixed configuration.

As mentioned above, the clamp band system in this example also comprises the locking nuts 152 and 154, which are configured for attaching the first screw shaft 20 and the second screw shaft 30 to the clamp band structure 155. In this manner, the locking nuts are configured for enabling transferring of axial loads between the clamp band structure and the separable roller screw assembly, i.e. within the clamp band system, at least until the components of the separable roller screw assembly 10 are set in motion according to the example embodiments of the disclosure. Typically, the locking nuts are also configured for enabling transferring of a bending moment between the clamp band structure and the separable roller screw assembly.

As described above, the clamp band system 150 having the clamp band structure 155 typically comprises the first end part 107 connected to the second end part 108 via the separable roller screw assembly 10, wherein the first end part 107 is expanded from the second end part 108 when the first shaft 20 of the separable roller screw assembly is axially displaced from the second shaft 30 of the separable roller screw assembly.

Before turning to the further description of the separable roller screw assembly 10, it is to be noted that although the description above has been made in relation to a separable roller screw assembly of a clamp band system, the example embodiments described hereinafter may likewise be implemented in another type of spacecraft release mechanism for separating a first space craft element from a second space craft element. One further example of a space craft release mechanism is described in conjunction with FIG. 6 below. Thus, the spacecraft release mechanism may be installed in various spacecraft applications.

The components of the separable roller screw assembly 10 will now be further described in conjunction with FIGS. 3a-3i. As illustrated in these figures, the separable roller screw assembly 10 comprises the first screw shaft 20 having a first external thread 21. In addition, the separable roller screw assembly 10 comprises the second screw shaft 30 having a second external thread 31. The first screw shaft 20 is further arranged axially separated from the second screw shaft 30. In other words, the separable roller screw assembly 10 comprises the first screw shaft 20 having the first external thread and being axially separated from the second screw shaft 30 having the second external thread. In this example embodiment, the separable roller screw assembly 10 forms the space craft release mechanism, which together with the clamp band structure as described above, is configured for separating the first space craft element 110 from the second space craft element 130. The clamp band system generally comprises the clamp band structure 155 and the separable roller screw assembly 10.

As shown in e.g. 3a, the separable roller screw assembly 10 comprises a rotatable nut module 40. The rotatable nut module 40 is coaxially arranged about the first screw shaft 20 and the second screw shaft 30. Further, the rotatable nut module 40 is configured for maintaining the planetary roller arrangement 50, the first screw shaft 20 and the second screw shaft 30 in the axially fixed configuration to permit the separable roller screw assembly 10 to carry a load F in the axial direction A corresponding to an axial tensile force $F_A$, whilst enabling displacement of the first screw shaft 20 relative to the second screw shaft 30 when the separable roller screw assembly 10 is released from the axially fixed configuration.

In this example, as will be further described hereinafter, the rotatable nut module 40 is configured for maintaining a planetary roller arrangement 50, the first screw shaft 20 and the second screw shaft 30 in the axially fixed configuration by the locking mechanism 70.

Typically, when the first screw shaft 20 and the second screw shaft 30 are in the first axially fixed configuration, the separable roller screw assembly 10 is further permitted to carry the load in a radial direction R corresponding to a bending moment. Thus, in some example embodiments, the separable roller screw assembly 10 is permitted to both carry a load in the axial direction A and a load in the radial direction R. In this context, it is also to be noted that the load distribution may vary due to environmentally induced loads such as vibrations, thermal loads and/or other external loads.

The rotatable nut module 40 may be provided in several different configurations. According to the example embodiment illustrated in FIGS. 3*a*-3*i*, the rotatable nut module 40 here comprises an internal surface 42 adapted for engaging the external thread regions of the multiple rollers 52 A-H. The internal surface 42 extends circumferential about the planetary roller arrangement 50, as shown in e.g. 3*b*.

In this example, the internal surface 42 comprises an internal thread region 43 adapted for engaging the external thread regions of the multiple rollers 52 A-H. Typically, as further described below, the thread regions of the rollers and the internal threads region of the rotatable nut module should match so that there is no relative axial displacement between the rollers and the rotatable nut module when they are rotating. By way of example, as illustrated in FIG. 3*i*, the internal thread region 43 comprises a first internal thread region 43A and a second internal thread region 43B. However, the internal thread region may also be a continuous internal thread region (although not shown).

According to some design variants, although not shown, the internal surface 42 is an essentially flat surface adapted for engaging the crest of the external thread regions of the multiple rollers 52 A-H.

Moreover, the separable roller screw assembly 10 comprises a planetary roller arrangement 50. The planetary roller arrangement 50 comprises a set of multiple rotatable rollers 52 A-H radially arrayed about the first screw shaft 20 and the second screw shaft 30, whilst being encapsulated by the rotatable nut module. In this manner, the internal surface 42 of the rotatable nut module engages the external thread regions of the multiple rollers 52 A-H. By way of example, the planetary roller arrangement 50 here comprises a number of eight rollers. However, the number of rollers may vary depending on type of assembly and installation.

Further, as illustrated in FIGS. 3*a*-3*i*, each one of the multiple rollers 52 A-H comprises first and second roller external thread regions 53 A-H, 54 A-H adapted to engage the first external thread 21 and the second external thread 31, respectively.

By way of example, as shown in FIG. 3*i*, the first external thread regions 53 A-H engage and cooperate with the first external thread 21. Analogously, the second external thread regions 54 A-H engage and cooperate with the second external thread 31.

Due to configuration of the assembly and its components, the assembly is capable of storing kinetic energy when the components of the assembly is released from the axially fixed configuration, thus being permitted to rotate relative each other in order to axially displace the first screw shaft relative the second screw shaft. Another advantage is that the components of the assembly hereby being configured to interact with rolling friction between the components, thus increasing reliability and reducing energy losses. In this manner, it becomes possible to control the frictional losses within the assembly in a better way compared to hitherto known solutions.

Figure 3A:
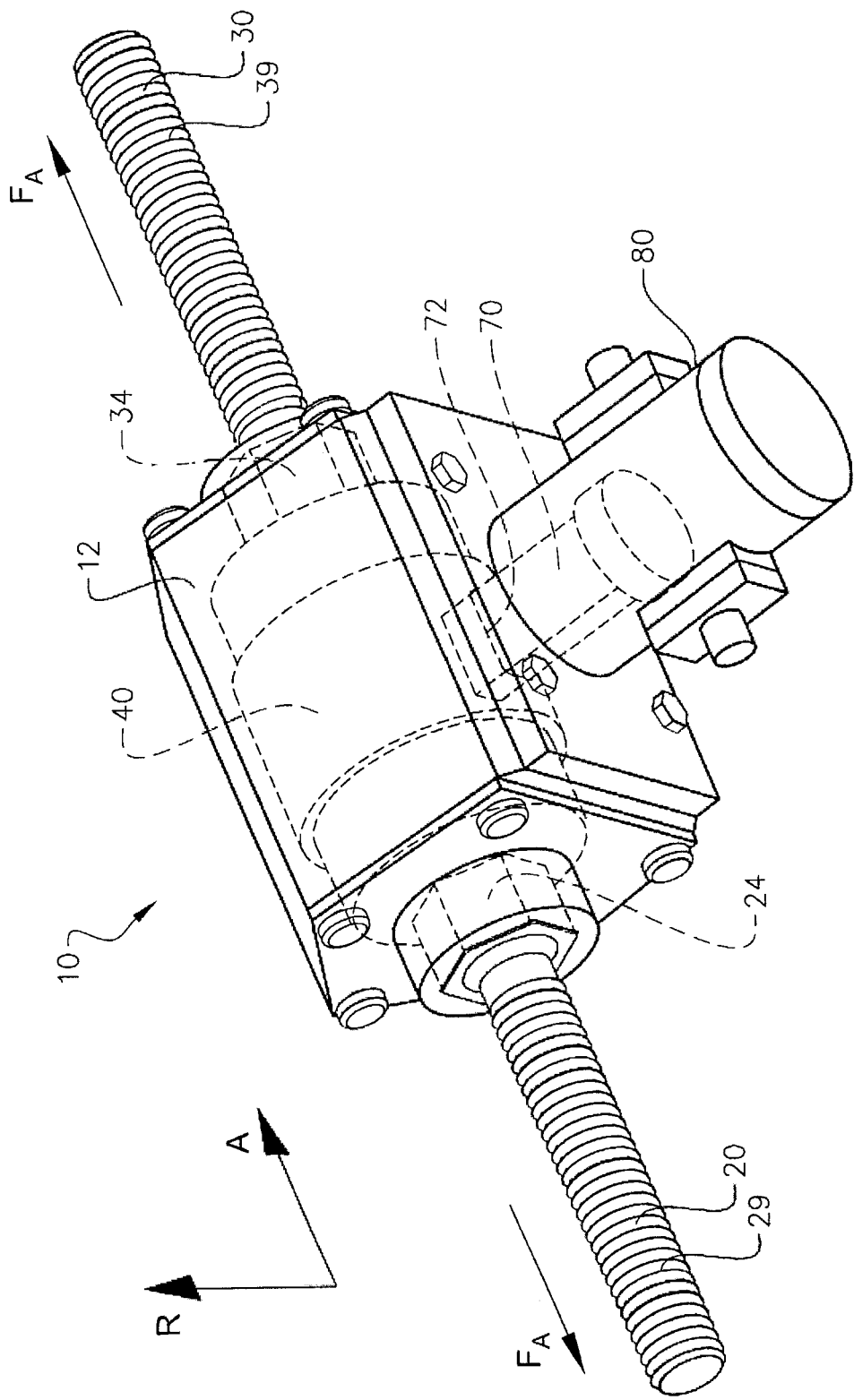
FIG. 3a is a perspective view of an example embodiment of parts of a separable roller screw assembly according to the disclosure, in which the separable roller screw assembly is in an axially fixed configuration.
Figure 3B:
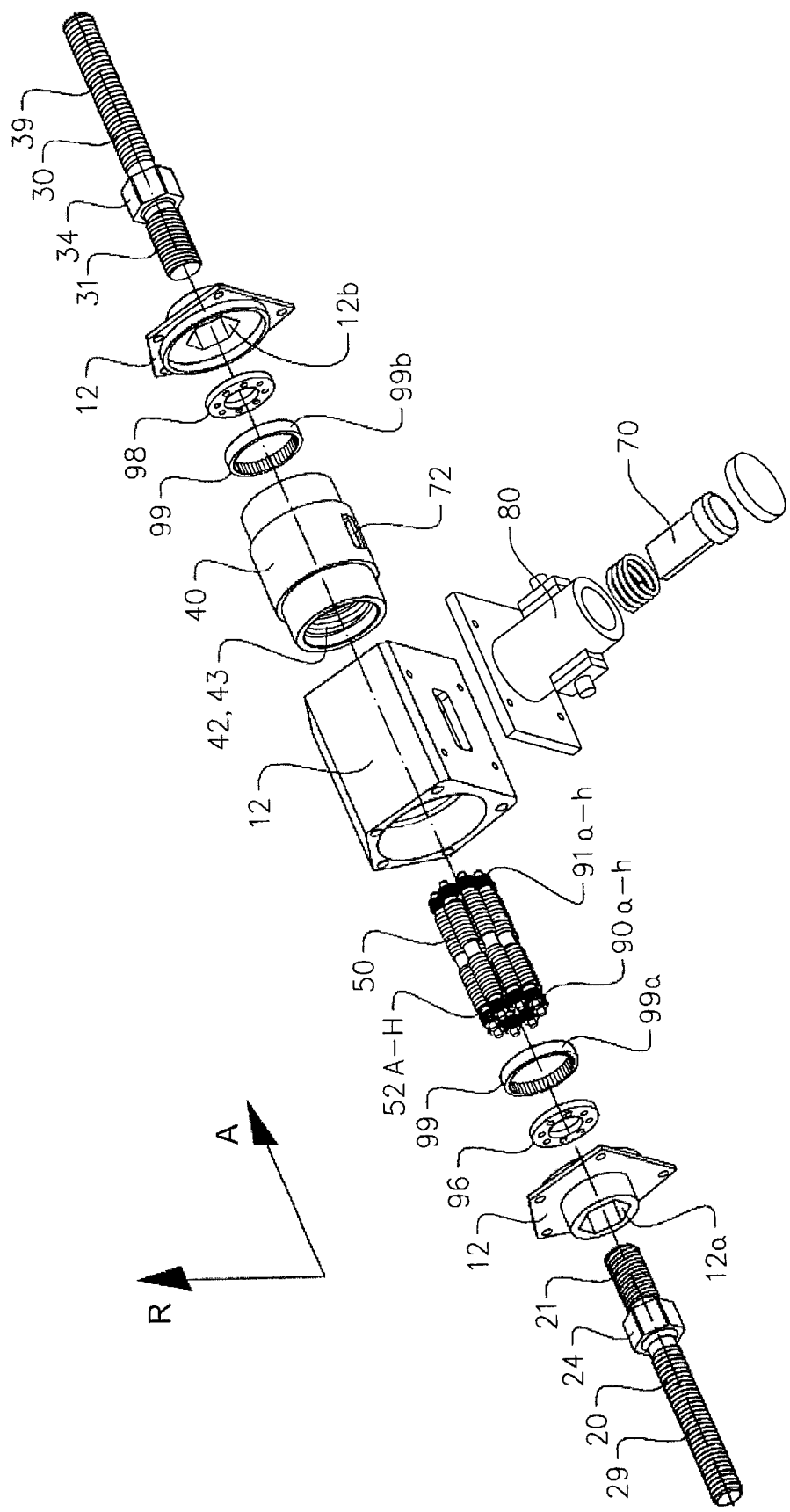
Figure 3C:
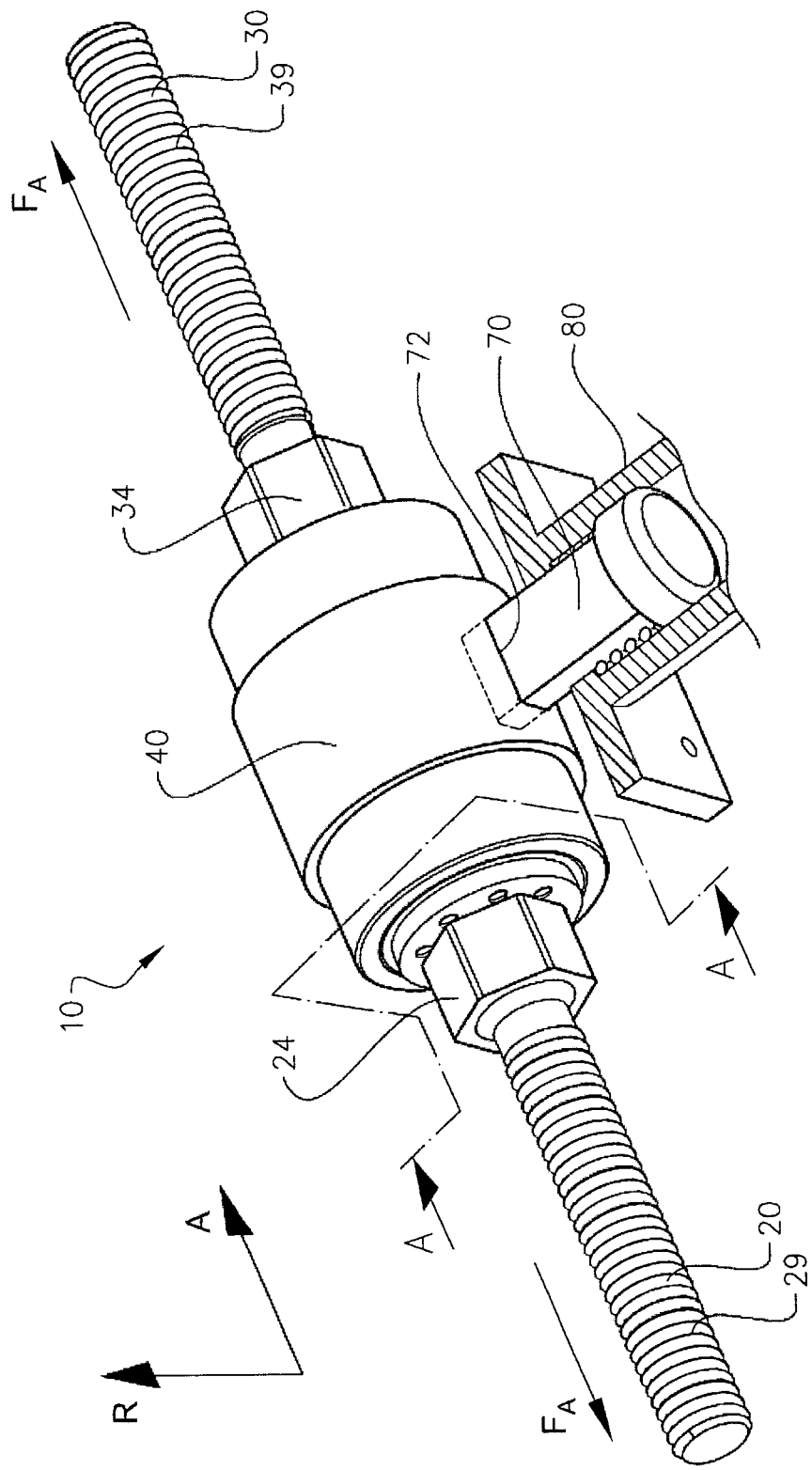
FIG. 3c is a perspective view of the example embodiment of parts of the separable roller screw assembly as shown in FIGS. 3a and 3b, in which the separable roller screw assembly is in the axially fixed configuration, but illustrated without a housing.
Figure 3E:
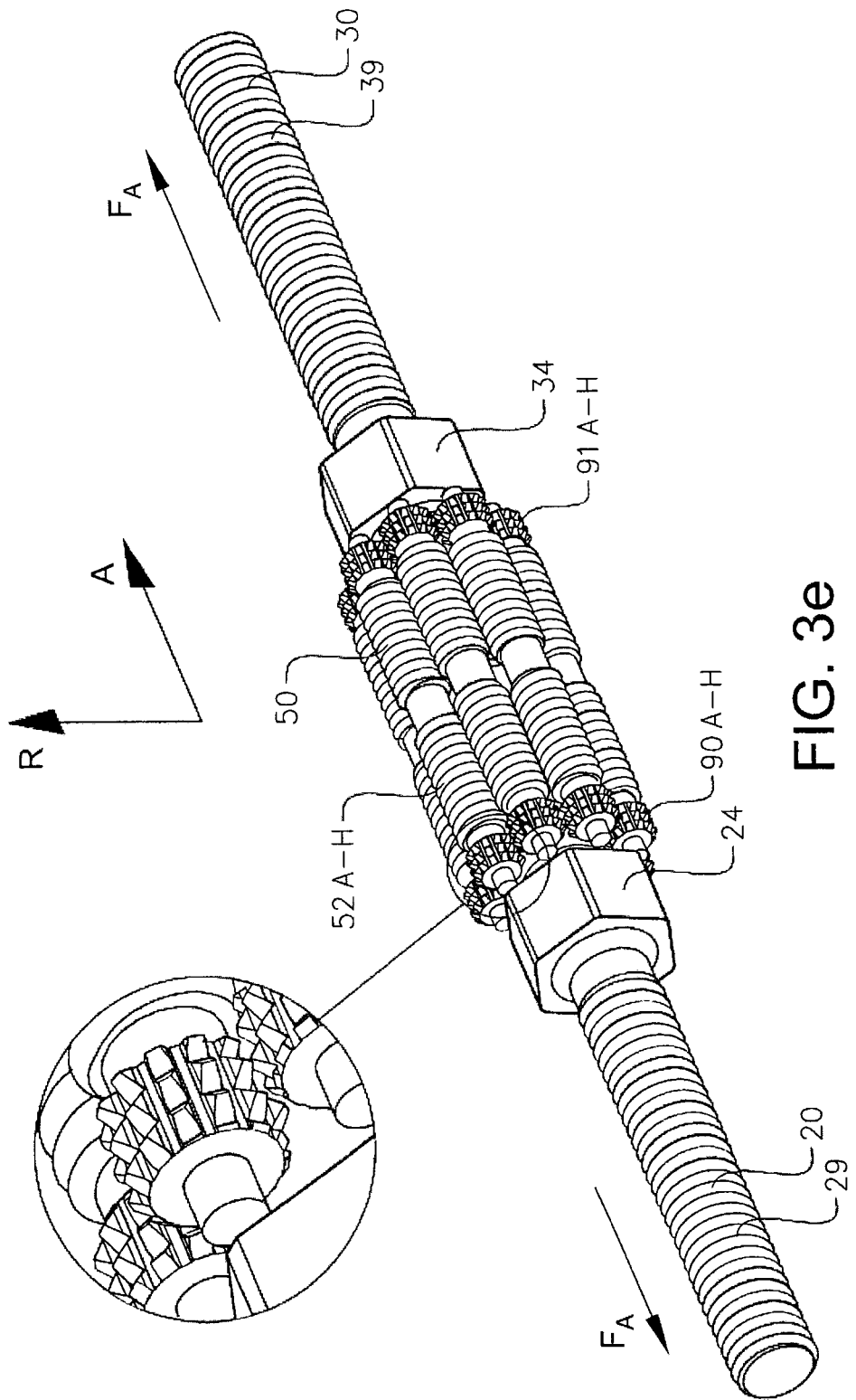
FIG. 3e is a perspective view of an example embodiment of parts of a separable roller screw assembly according to the disclosure, whilst illustrated without a rotatable nut module, and in which the separable roller screw assembly is in an axially fixed configuration.
Figure 3F:
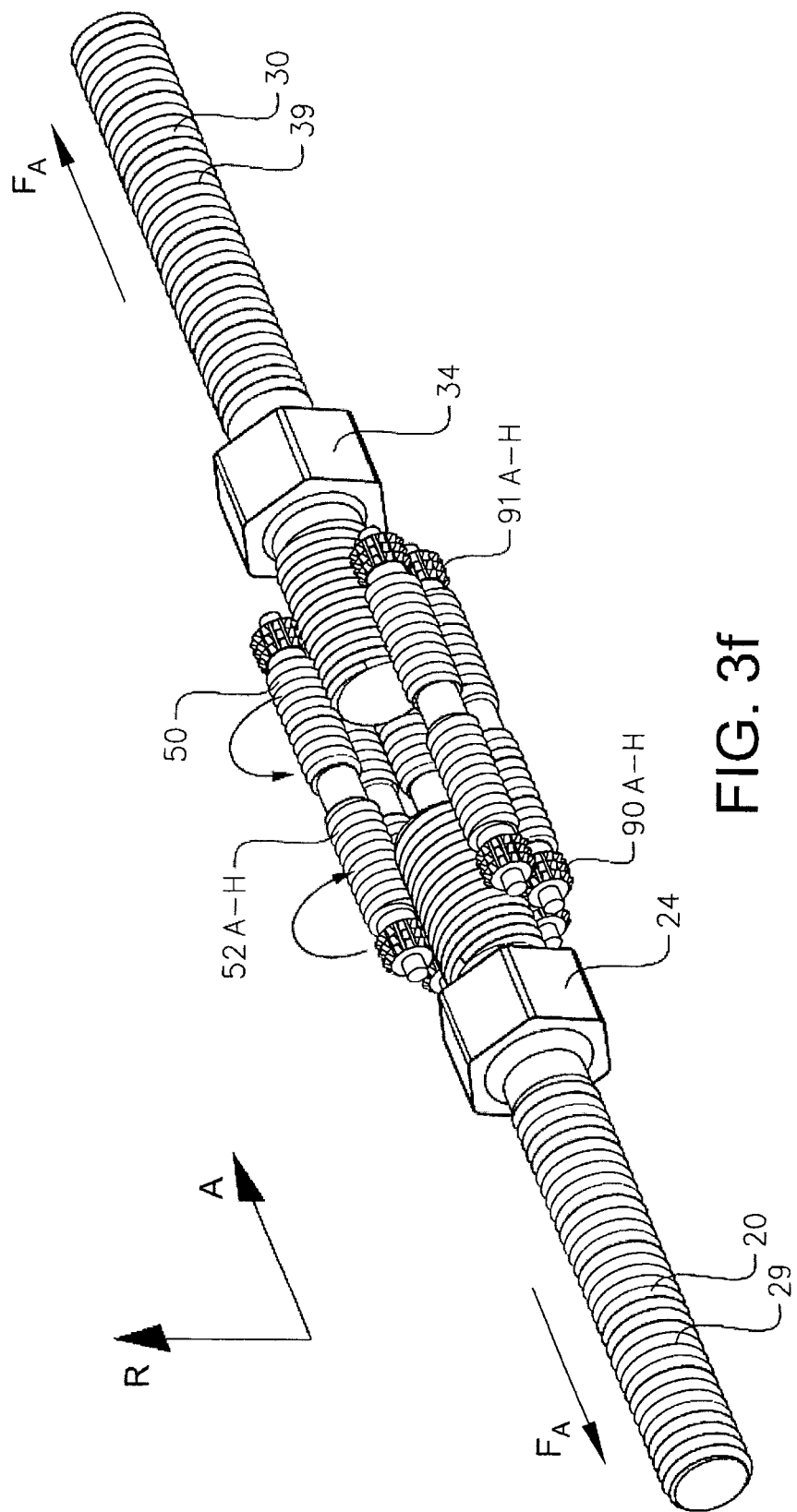
FIG. 3f schematically illustrates an example embodiment of parts of a separable roller screw assembly according to the disclosure, in which a first screw shaft is slightly axially displaced from a second screw shaft of the assembly.
Figure 3G:
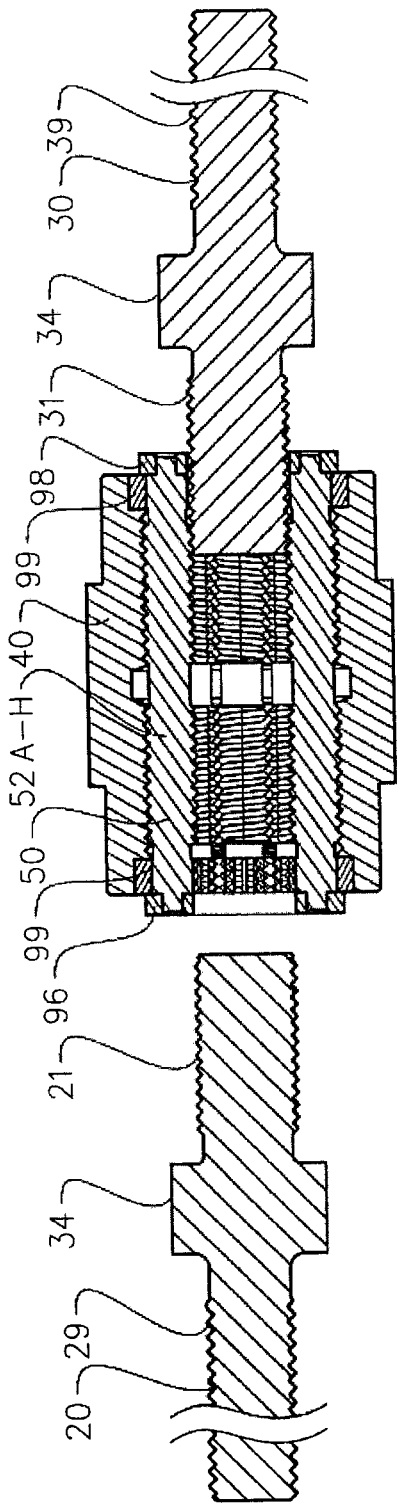
FIG. 3g schematically illustrates an example embodiment of parts of a separable roller screw assembly according to the disclosure, in which the first screw shaft is separated from the other parts of the assembly.
Figure 3H:
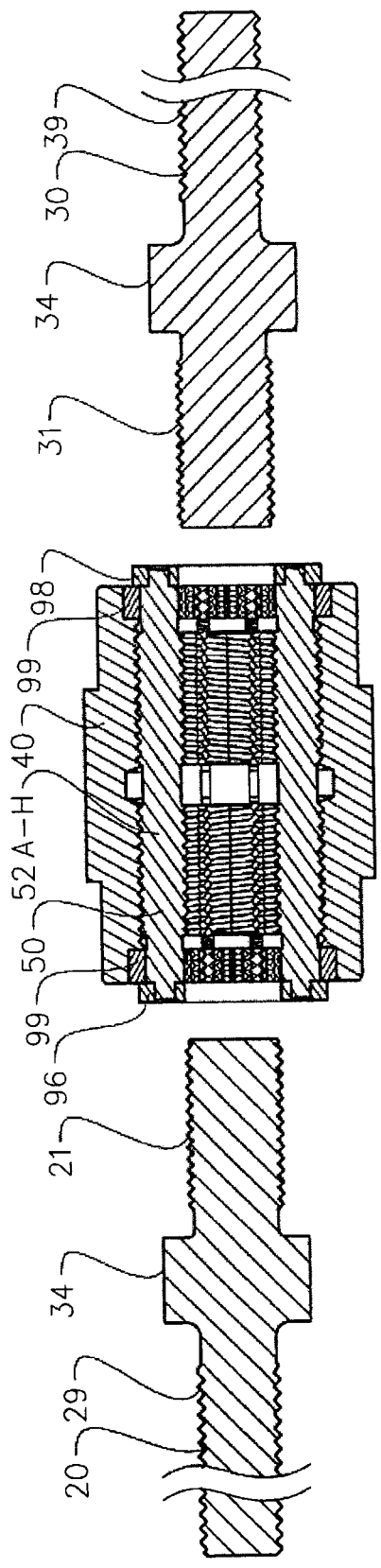
FIG. 3h schematically illustrates an example embodiment of parts of a separable roller screw assembly according to the disclosure, in which the first screw shaft and the second screw shaft are separated from the other parts of the assembly.
Figure 3I:
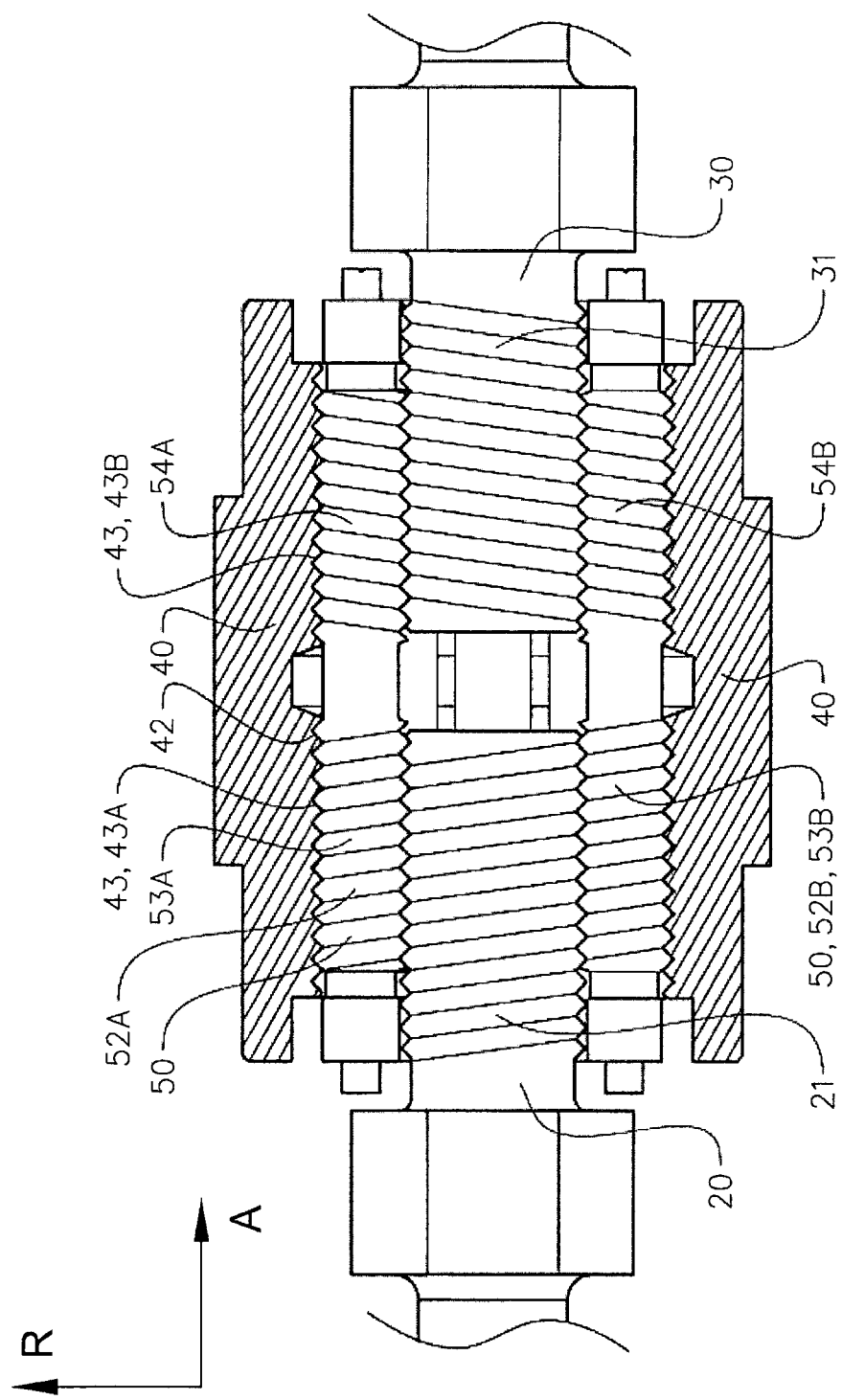
FIG. 3i is a cross-sectional view along an axial direction of an example embodiment of parts of the separable roller screw assembly according to the disclosure.

In the example embodiment as illustrated in FIGS. 3*a*-3*i*, the rotatable nut module 40 is configured for maintaining the first screw shaft 20 and the second screw shaft 30 in the axially fixed configuration by the locking mechanism 70, which is illustrated in e.g. FIGS. 3*a*-3*c*. The locking mechanism 70 is configured to prevent the first screw shaft 20, the second screw shaft 30, the planetary roller arrangement 50 and the rotatable nut module 40 to rotate relative each other. As an example, as illustrated in FIGS. 3*a*-3*c*, the locking mechanism 70 is a pin such as a locking pin. Further, in this example embodiment, the rotatable nut module has a recess 72 extending through the rotatable nut module in a radial direction R. The locking mechanism 70 is arranged to prevent rotation of the rotatable nut module 40. Hereby, the locking mechanism is configured to prevent rotation of the rotatable nut module. That is, the locking mechanism is configured to prevent rotation of the rotatable nut module when the assembly 10 is in the axially fixed configuration. However, it is also to be noted that the assembly is typically provided with the overall locking arrangement as described above in order to maintain the rotatable components of the assembly in the non-rotatable state when the assembly is in the axially fixed configuration. Thus, the locking mechanism is typically a part of the overall locking arrangement as mentioned above. In other words, as shown in FIGS. 3*a*-3*c*, the locking arrangement is here provided by the housing 12, a set of rotational stop units 24 and 34 and the locking mechanism 70. In this example, each rotational stop unit is part of the first screw shaft and the second screw shaft. Further, each one of the rotational stop units 24 and 34 is accommodated in a corresponding recess in the housing, recess 12*a* and recess 12*b*. Thus, the housing 12 comprises the set of recesses 12*a* and 12*b* arranged on opposite sides of the housing, as seen in the axial direction A. Each one of the recesses 12*a* and 12*b* is configured for accommodating a rotational stop unit. The locking arrangement is configured for maintaining the separable roller screw assembly 10 in the axially fixed configuration, i.e. in the non-rotatable state relative the clamp band structure and the clamp band system, until the locking arrangement is released from its locking state, e.g. by the blasting charge module 80, In other design variants, the locking mechanism is a separate part of the assembly which is configured to interact with the locking arrangement. However, other design variants are also conceivable in order to maintain the assembly in the axially fixed configuration. For instance, the separable roller screw assembly may be provided with the locking mechanism only and always include the general locking arrangement.

It should be readily appreciated that due to that the locking mechanism 70 is configured to prevent the first screw shaft 20, the second screw shaft 30, the planetary roller arrangement 50 and the rotatable nut module 40 to rotate relative each other, the components are hereby prevented from being displaced from each other in the axial direction A when the assembly is in the axially fixed configuration. Hence, as the first screw shaft 20, the second screw shaft 30, the planetary roller arrangement 50 and the rotatable nut module 40 are prevented from rotating relative each other, the first screw shaft 20, the second screw shaft 30, the planetary roller arrangement 50 and the rotatable nut module 40 are prevented from being axially displaced relative each other, as seen in the axial direction A. In other words, the locking mechanism 70 is configured to prevent the first screw shaft 20, the second screw shaft 30, the planetary roller arrangement 50 and the rotatable nut module 40 to displace axially relative each other, as seen in the axial direction.

Accordingly, as the rotatable nut module is arranged to engage the planetary roller arrangement and also arranged to indirectly interact with the first screw shaft and the second screw shaft via the planetary roller arrangement, it will be readily understood that the planetary roller arrangement and the first and second screw shafts are prevented from rotation by the configuration and arrangement of the rotatable nut module and the locking mechanism when the assembly is in the axially fixed configuration. When the locking mechanism is released from its locking state, the separable roller screw assembly is released from the axially fixed configuration.

To this end, the locking mechanism is configured to release the separable roller screw assembly from the axially fixed configuration. By way of example, the locking mechanism is configured to release the separable roller screw assembly from the axially fixed configuration upon a manipulation by a user. The locking mechanism can be set to release the separable roller screw assembly from the axially fixed configuration at a point in time decided by the user. However, the locking mechanism can be configured to release the separable roller screw assembly from the axially fixed configuration in other suitable ways.

In order to release the separable roller screw assembly 10 from the axially fixed configuration, the locking mechanism 70 is configured to be released from its locking state such that e.g. the first screw shaft is permitted to displace axially from the second screw shaft via rotation of the rotatable nut module and the planetary roller arrangement about the first and second screw shafts, when the assembly 10 is subjected to the axial tensile force.

The locking mechanism can be released from its locking state in several different ways. Optional, although not strictly required, the locking mechanism is configured to be released from its locking state within a certain time range. In the example embodiment illustrated in FIGS. 3a-3i, in which the locking mechanism is a pin, the locking mechanism is released from its locking state rather slowly. By way of example, the time of release may be equal to or less than 10 milliseconds.

The release of the locking mechanism from its locking state may be carried out by an external signal such as by a blasting charge, powder charge, pressurized air, spring mechanism or the like.

In the illustrated example, the release of the locking mechanism is carried out by a blasting charge module 80. However, other options are conceivable as long as the locking mechanism can be efficiently released upon request by the user. The arrangement of the blasting charge module is illustrated in e.g. FIG. 2b above. However, other options and arrangement are conceivable in this context.

As mentioned above, when the locking mechanism 70 is released from its locking state, the separable roller screw assembly 10 is released from the axially fixed configuration.

Thus, when the separable roller screw assembly 10 is released from the first axially fixed configuration and subjected to the axial tensile force $F_A$, the first screw shaft 20 is permitted to displace axially from the second screw shaft 30 via rotation of the planetary roller arrangement about the first and second screw shafts 20, 30. The on-going separation of the components is e.g. schematically illustrated in FIG. 3f. Typically, in this example embodiment, the rotatable nut module 40 is also configured to rotate when the separable roller screw assembly 10 is released from the axially fixed configuration because the rotatable nut module is hereby set into a rotatable state as described above. Thus, it should be readily appreciated that then when the separable roller screw assembly is released from the first axially fixed configuration and subjected to the axial tensile force, the first screw shaft is permitted to displace axially from the second screw shaft via rotation of the planetary roller arrangement about the first and second screw shafts and via rotation of the rotatable nut module. That is, when the rotatable nut module is permitted to rotate, the first screw shaft is axially displaced from the second screw shaft via rotation of the rotatable nut module about the planetary roller arrangement and rotation of the planetary roller arrangement about the first and second screw shafts.

In order to allow at least one component of the separable roller screw assembly 10 to separate from the other components of the assembly, it should be readily appreciated that the relative axial separation of the first and second screw shafts 20 and 30 is on-going until at least one of them is separated from the other components of the assembly 10, as shown in FIG. 3g. When at least one of the shafts is separated from the other components of the assembly, the clamp band system as described before is expanded, or opened, due to separation of at least one part of the assembly 10 from the other parts of the assembly 10 so as to permit the first space craft element to separate from the second space craft element.

That is, when at least one part, e.g. the first screw shaft 20, of the separable roller screw assembly 10 is released from the other parts of the separable roller screw assembly 10, as also shown in FIG. 1b, the first spacecraft element 110 is capable of separating from the second spacecraft element 130 upon expansion of the clamp band system 150.

As an example, as shown in FIG. 3g, the first screw shaft 20 is axially displaced from the second screw shaft 30 at least until the first screw shaft is separated from any one of the rotatable nut module 40 and the planetary roller arrangement 50. Typically, although not strictly required, the first screw shaft 20 is axially displaced from the second screw shaft 30 at least until the first screw shaft 20 is separated from both the rotatable nut module 40 and the planetary roller arrangement 50. Hence, the first screw shaft 20 is axially displaceable from the second screw shaft 30 at least until the first screw shaft is separated from any one of the rotatable nut module 40 and the planetary roller arrangement 50.

In some design variations, as illustrated in FIG. 3h, both the first screw shaft 20 and the second screw shaft 30 are axially displaced relative to the rotatable nut module and the planetary roller arrangement. Hence, both the first screw shaft 20 and the second screw shaft 30 are axially displaceable relative to the rotatable nut module and the planetary roller arrangement.

In these variants, the first screw shaft 20 and the second screw shaft 30 are typically, although not strictly necessary, axially displaced relative to the rotatable nut module 40 and the planetary roller arrangement 50 at least until the first shaft and the second shaft are separated from the rotatable nut module and the planetary roller arrangement.

Thus, it should be readily understood that although it is sufficient that only one shaft is separated from the other parts of the assembly 10, both shafts 20 and 30 can simultaneously separate from the rotatable nut module and the planetary roller arrangement (assembly).

As mentioned above, the first and second screw shafts 20 and 30 and each one of the multiple rollers 52 A-H comprises external threads or external threads regions. In addition, the rotatable nut module 40 optional comprises an internal threads region. The design of the threads of the various components of the separable roller screw assembly can be varied in several different ways. As such, the external threads of the shafts, the external thread regions of the multiple rollers and the optional choice of providing the rotatable nut module with the internal threads region can be provided in several different design variants in order to provide the example advantages as mentioned above. Different combinations of threads will give a different gear ratio of the axial displacement versus the rotation of the rollers and rotatable nut module. Some combinations of threads will give a symmetrical mechanism, and some will give a non-symmetrical mechanism. In this context, a symmetrical mechanism refers to a configuration of the threads so that the gear ratio is equal for the axial displacement of the first shaft and the axial displacement of the second shaft. Thus, the ultimate design and the ultimate combination of the components and threads are selected depending on the general type of use, installation and function of the assembly 10. In addition, it should be readily appreciated that any gear ratio may be obtained by choosing a certain combination of the directions of the threads, an appropriate size (typically referring to the diameter) of the components, and an appropriate pitch for the given purpose of the example embodiments of the disclosure.

By way of example, as shown in FIGS. 3a-3i, i.e. when the rotatable nut module is provided the internal thread region, the thread regions of the rollers and the internal threads region of the rotatable nut module should match so that there is no relative axial displacement between the rollers and the rotatable nut module when they are rotating.

FIG. 3i illustrates one example embodiment of a suitable combination of the direction of the threads of the components. In this example embodiment, the first external thread 21 of the first screw shaft 20 is a right-handed thread region. In addition, the first roller external thread region 53A of the roller 52A of the multiple rollers is a right-handed thread. In other words, it is readily understood that the first roller external thread regions 53A-H of all rollers 52A-H of the multiple rollers are right-handed threads. Further, in this example, the internal thread region 43 of the rotatable nut module 40 is defined by a first internal thread region 43A and a second internal thread region 43B. The first internal thread region 43A of the rotatable nut module is a right-handed thread. The threads on the other side of the assembly are in this example embodiment design to be left-handed threads. In other words, the second internal thread region 43B of the rotatable nut module is a left-handed thread. Thus, the second roller external thread region 54A of the roller 52A of the multiple rollers is a left-handed thread. In other words, it is readily understood that the second roller external thread regions 54A-H of all rollers 52A-H of the multiple rollers are left-handed threads. Finally, the second external thread 31 of the second screw shaft 30 is a left-handed thread region. To this end, it is readily appreciated that in order to obtain an axially displacement of the first screw shaft 20 relative to the second screw shaft 30, a thread and/or thread region of each component of the assembly is adapted to engage and cooperate with a corresponding thread and/or thread region of a corresponding component when the assembly is released from the first axially fixed configuration, as mentioned above.

In other examples, the thread is provided with no pitch, i.e. the thread is a groove with "zero pitch". In these types of examples, the component typically comprises a plurality of spaced apart threads. In other words, the component in this example comprises a plurality of spaced apart threads with no pitch being distributed along an axial direction of the component. The component as mentioned above may refer to any one of the first screw shaft, the second screw shaft, the roller(s) of the planetary roller arrangement and/or the rotatable nut module.

FIG. 4 illustrates another example embodiment of a suitable combination of the direction of the threads of the components. In this example embodiment, the first external thread 21 of the first screw shaft 20 is a right-handed thread region. In addition, the first roller external thread region 53A of the roller 52A of the multiple rollers is a thread region with no pitch. That is, the first roller external thread region 53A of the roller 52A of the multiple rollers comprises a plurality of spaced apart threads with no pitch being distributed along the axial direction of the roller. In other words, it is readily understood that the first roller external thread regions 53A-H of all rollers 52A-H of the multiple rollers comprise a plurality of spaced apart threads with no pitch being distributed along the axial direction of the rollers. Further, in this example, the internal thread region 43 of the rotatable nut module 40 is defined by a first internal thread region 43A and a second internal thread region 43B. The first internal thread region 43A of the rotatable nut module also comprises a plurality of spaced apart threads with no pitch being distributed along the axial direction of the nut module. Similarly, the second internal thread region 43B of the rotatable nut module comprises a plurality of spaced apart threads with no pitch being distributed along the axial direction of the nut module. Further, the second roller external thread region 54A of the roller 52A of the multiple rollers is a thread region with no pitch. That is, the second roller external thread region of the roller of the multiple rollers comprises a plurality of spaced apart threads with no pitch being distributed along the axial direction of the roller. In other words, it is readily understood that the second roller external thread regions 54A-H of all rollers 52A-H of the multiple rollers comprise a plurality of spaced apart threads with no pitch being distributed along the axial direction of the rollers. Finally, the second external thread 31 of the second screw shaft 30 is a left-handed thread region. To this end, it is readily appreciated that in order to obtain an axially displacement of the first screw shaft 20 relative to the second screw shaft 30, a thread and/or thread region of each component of the assembly is adapted to engage and cooperate with a corresponding thread and/or thread region of a corresponding component when the assembly is released from the first axially fixed configuration, as mentioned above.

The example embodiments mentioned above are only two possible combinations of threads of the assembly, thus other alternatives may be conceivable. In other words, the first external thread of the first screw shaft can be a right-handed thread, a left-handed thread or a groove with zero pitch. If the thread is a groove with zero pitch, the first screw shaft generally comprises a number of first external threads defined as grooves with no pitch, and being arranged spaced apart along the axial direction of the first screw shaft.

Analogously, the second external thread of the second screw shaft can be a right-handed thread, a left-handed thread or a groove with zero pitch. If the thread is a groove with zero pitch, the second screw shaft generally comprises a number of second external threads defined as grooves with no pitch, and being arranged spaced apart along the axial direction of the second screw shaft.

The first external thread region of a roller of the multiple rollers is adapted to engage the first external thread of the first screw shaft. The first roller external thread region of a roller can be a right-handed thread, a left-handed thread or a groove with zero pitch.

Analogously, the second external thread region of said roller of the multiple rollers is adapted to engage the second external thread of the second screw shaft. The second roller external thread region of a roller can be a right-handed thread, a left-handed thread or a groove with zero pitch.

According to an example embodiment (although not shown), the first and/or second roller external thread regions of each one of the multiple rollers extend along the roller to form a continuous external thread section. In this manner, the planetary roller arrangement and the assembly is easier to manufacture. In addition, by this configuration it becomes possible to make the assembly more compact.

When the first roller external thread region of a roller of the multiple rollers and the second roller external thread region of said roller of the multiple rollers form a continuous external thread section, the continuous external thread section may have a left-handed external thread, a right-handed thread, or a groove with zero pitch.

Furthermore, when the rotatable nut module comprises the internal thread region, the internal thread region may have a left-handed internal thread, a right-handed internal thread, or a groove with zero pitch.

According to an example embodiment (although not shown), the internal thread of the rotatable nut module forms a continuous internal thread section. In this manner, the rotatable nut module is easier to manufacture. In addition, it becomes possible to make the assembly more compact.

The separable roller screw assembly may be provided with other optional features depending on use and installation, as described hereinafter.

For example, in all example embodiments of the separable roller screw assembly, the assembly may optional include side cover plates sometimes also denoted as end caps 96 and 98, as shown in FIG. 3b. The side cover plates are arranged on opposite sides of the rotatable nut module 40, as seen in the axial direction A. By having a set of end caps arranged on each side of the rotatable nut module, it becomes possible to provide a means for retaining the rollers 52 A-H in the rotatable nut module 40 after separation of the assembly, e.g. after separation of one shaft from the assembly. In addition, the end caps 96 and 98 are also arranged on opposite sides of the module 40 in order to protect the mechanics of the assembly from dirt during use of the assembly. Furthermore, the end caps 96 and 98 are typically configured for maintaining the multiple rollers 52 A-H spaced apart from each other, as seen in a circumferential direction C of the assembly, which is e.g. indicated in FIG. 3d. In this manner, the end caps ensure that there is no contact between the multiple rollers 52 A-H during use of the assembly, but also after separation of the assembly. Thus, each end cap may be provided with a number of recesses for receiving an end part of each roller 52 A-H, as shown in e.g. FIG. 3b.

In some design variant, the assembly may include a set of cog wheels interacting with a number of cogs on the rollers of the planetary gear arrangement in order to position the rollers of the planetary gear arrangement in a correct relationship to each other. Thus, as illustrated in FIG. 3b, the example embodiment of the assembly here includes a set of collars 99 arrangeable on opposite sides of the planetary roller arrangement 50, as seen in the axial direction A. Each one of the collars 99 includes an inner arrangement of teeth configured for engaging a number of teeth on a roller of the planetary roller arrangement 50, see also FIGS. 3b and 3d. Accordingly, the assembly typically, although not strictly necessary, comprises a first collar 99a having an inner arrangement of teeth and a second collar 99b having an inner arrangement of teeth.

Further, as shown in FIGS. 3b and 3d, each one of the multiple rollers 52 A-H comprises an opposite set of cogs 90 A-H and 91 A-H. The first collar 99a with the inner arrangement of teeth is arranged about the planetary roller arrangement so that the inner arrangement of teeth is arranged to engage the first set of cogs 90 A-H, respectively. Analogously, the second collar 99b with the other set of inner arrangement of teeth is arranged about the other side of the planetary roller arrangement so that the inner arrangement of teeth is arranged to engage the second set of cogs 91 A-H, respectively. The purpose of this arrangement with the cog wheels and cogs is to further improve the positioning of the multiple rollers in the assembly.

It is to be noted that in some design variants, the assembly may only include one cog wheel interacting with a corresponding cog on the rollers of the planetary gear arrangement in order to position the rollers of the planetary gear arrangement in a correct relationship to each other.

Further, it is to be noted that the set of cog wheel(s) may typically be integrated in the rotatable nut module of the assembly.

As is readily appreciated from the above, the multiple rollers 52 A-H of the arrangement 50 are typically arranged spaced apart from each other, as seen in the circumferential direction C.

Figure 5:
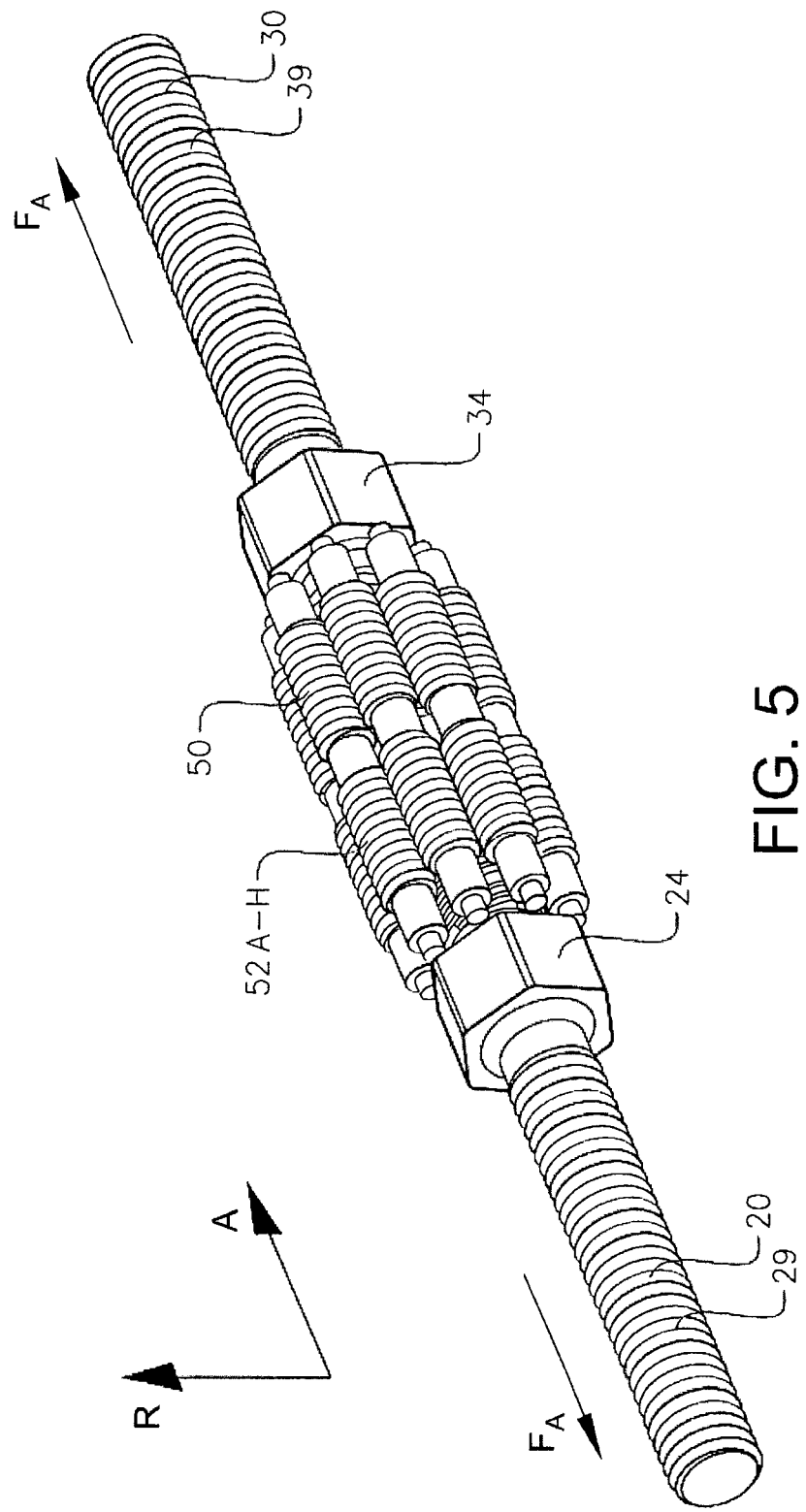
FIG. 5 is a perspective view of another example embodiment of parts of a separable roller screw assembly according to the disclosure, whilst illustrated without a rotatable nut module, and in which the separable roller screw assembly is in an axially fixed configuration.

FIG. 3e schematically illustrates an example embodiment in which the separable roller screw assembly comprises a number of cog wheels and cogs 90 A-H and 91 A-H. However, it is to be noted that the separable roller screw assembly 10 may likewise be provided without any cog wheels and cogs, as schematically illustrated in FIG. 5. The example embodiment illustrated in FIG. 5 may include any one of the features, configurations and functions as described in relation to the examples of the assembly shown in FIGS. 3a-3i and 4.

It is to be noted that although the description above has been made in relation to a separable roller screw assembly of a clamp band system, the example embodiments of the assembly as described herein may likewise be implemented in another type of space craft release mechanism configuration for separating a first space craft element from a second space craft element. Further, the separable roller screw assembly may itself constitute the space craft release mechanism. Thus, the space craft release mechanism may be installed in various spacecraft applications. In addition, or alternatively, the space craft release mechanism may be operatively connected to a spacecraft element in several different ways.

Figure 6:
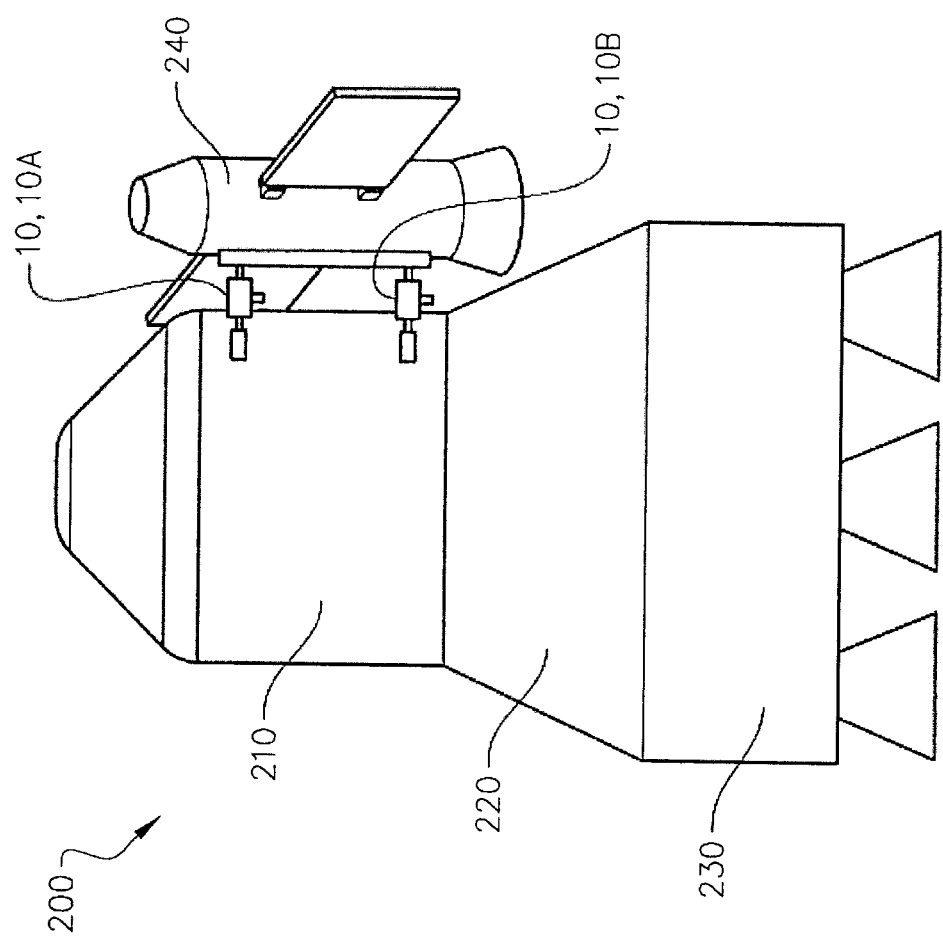
FIG. 6 schematically illustrates a side view of another example embodiment of parts of a space craft release mechanism comprising a separable roller screw assembly according to the disclosure.

FIG. 6 schematically illustrates an example embodiment of a space craft release mechanism for separating a first space craft element from a second space craft element, in which the release mechanism comprises the separable roller screw assembly according to any one of the example embodiments described above in conjunction with FIGS. 3a-4.

As shown in FIG. 6 there is depicted a spacecraft 200 which in this example comprises a first space craft element 240, a second space craft element 210 and a third space craft element 230. In addition, the third space craft element may include a load-bearing interface assembly 220, as previous described in conjunction with FIGS. 1a-1b. The first space craft element 240 is here a satellite, as shown in FIG. 6, which is releasable connected to the second space craft element 210 by a first space craft release mechanism 10a and a second space craft release mechanism 10b. It is to be noted, however, that the first space craft element 240 may be releasable connected to the second space craft element 210 by one single space craft release mechanism, only. Also, the first space craft element may be releasable connected to the second space craft by more than two space craft release mechanisms.

In this example, as shown in FIG. 6, each one of the space craft release mechanisms 10a and 10b is further adapted to connect to the first space craft element 240 and the second space craft element 210. Each one of the space craft release mechanisms 10a and 10b may comprise any one of the features, examples, design variants, functions of the separable roller screw assembly as described above in relation to FIGS. 3a-5.

As described above with respect to the clamp band system and the separable roller screw assembly, a separation of the space craft elements 240 and 210 is obtained when at least one part of each space craft release mechanism 10a and 10b is separated from the other parts of each space craft release mechanism 10a and 10b, respectively. If the space craft elements 240 and 210 only are releasable connected by one space craft release mechanism, the separation of the space craft elements 240 and 210 is obtained when at least one part of the space craft release mechanism is separated from the other parts of said space craft release mechanism.

The space craft release mechanism (corresponding to the separable roller screw assembly 10) is set to separate when it is released from its axially fixed configuration, which is described above in relation to FIGS. 3a-5. Thus, by way of example, each one of the space craft release mechanisms is released from the axially fixed configuration when the locking mechanism is deactivated (not shown in FIG. 6).

Thus, when the space craft release mechanism 10a or 10b is released from the axially fixed configuration and subjected to the axial tensile force $F_A$, the first screw shaft 20 is permitted to displace axially from the second screw shaft 30 via rotation of the planetary roller arrangement about the first and second screw shafts 20, 30. Typically, in this example embodiment, the rotatable nut module 40 is also configured to rotate when the space craft release mechanism is released from the axially fixed configuration because the rotatable nut module is hereby set into a rotatable state as described above. Thus, it should be readily appreciated that then when the space craft release mechanism is released from the axially fixed configuration and subjected to the axial tensile force, the first screw shaft is permitted to displace axially from the second screw shaft via rotation of the planetary roller arrangement about the first and second screw shafts and via rotation of the rotatable nut module. That is, when the rotatable nut module is permitted to rotate, the first screw shaft is axially displaced from the second screw shaft via rotation of the rotatable nut module about the planetary roller arrangement and rotation of the planetary roller arrangement about the first and second screw shafts.

In order to allow that at least one component of the space craft release mechanism 10a or 10b to separate from the other components of the mechanism, it should be readily appreciated that the relative axial separation of the first and second screw shafts 20 and 30 is on-going until at least one of them is separated from the other components of the space craft release mechanism. When at least one of the shafts is separated from the other components of the space craft release mechanism, the first space craft element 240 is permitted to separate from the second space craft element 210. It should be readily appreciated that for an example including two the space craft release mechanisms, as shown in FIG. 6, it is necessary that both space craft release mechanisms 10a and 10b are separated as described above in order to allow for a complete separation of the first space craft element from the second space craft element.

Typically, as mentioned above, the first screw shaft should be axially displaced from the second screw shaft at least until the first screw shaft is separated from any one of the rotatable nut module and the planetary roller arrangement in order to ensure that the first space craft element is separated from the second space craft element.

In addition, in this example embodiment, when the first screw shaft is axially displaced from the second screw shaft, the second screw shaft remains essentially axially non-displaceable relative to the rotatable nut module and the planetary roller arrangement.

In other words, in this example embodiment, at least one of the shafts is arranged in an axially fixed orientation to a space craft element. To this end, the first shaft is connectable to the first space craft element and the second shaft is connectable to the second space craft element.

Besides the above description of the example embodiment in FIG. 6, it is possible that any one of the features and/or example embodiments as described in relation to FIGS. 3a-5 may be incorporated in any one of the space craft release mechanisms 10a and 10b.

Reference signs mentioned in the claims should not be seen as limiting the extent of the matter protected by the claims, and their sole function is to make claims easier to understand.

As will be realised, the disclosure is capable of modification in various obvious respects, all without departing from the scope of the appended claims. Accordingly, the drawings and the description thereto are to be regarded as illustrative in nature, and not restrictive. It should be understood that the spacecraft release mechanism, the separable roller screw assembly and its components are not intended to be limited to the particular forms disclosed. Rather, they are intended to include all modifications, equivalents, and alternatives falling within the scope of the claims. They are further intended to include embodiments that may be formed by combining features from the disclosed embodiments, and variants thereof. As such, the described embodiments are to be considered in all respects only as illustrative and not restrictive. The scope of the disclosure is, therefore, indicated by the appended claims rather than by the foregoing description.

The invention claimed is:

1. A separable roller screw assembly comprising:
   a first screw shaft comprising a first external thread, wherein the first screw shaft is axially separated from a second screw shaft comprising a second external thread;
   a planetary roller arrangement comprising multiple rotatable rollers radially arrayed about the first screw shaft and the second screw shaft, wherein each of the multiple rollers is encapsulated by a rotatable nut module, and wherein each one of the multiple rollers comprises a first roller external thread region and a second roller external thread region adapted to engage the first external thread and the second external thread, respectively, the rotatable nut module is coaxially arranged about the first screw shaft and the second screw shaft and configured for maintaining the planetary roller arrangement, the first screw shaft and the second screw shaft in an axially fixed configuration to permit the separable roller screw assembly to carry a load in an axial direction corresponding to an axial tensile force, while enabling displacement of the first screw shaft relative to the second screw shaft when the separable roller screw assembly is released from the axially fixed configuration; and wherein, when the separable roller screw assembly is released from the axially fixed configuration and subjected to the axial tensile force, the first screw shaft is permitted to displace axially from the second screw shaft via rotation of the planetary roller arrangement about the first screw shaft and the second screw shaft.

2. The separable roller screw assembly according to claim 1, wherein the first screw shaft is axially displaceable from the second screw shaft at least until the first screw shaft is separated from any one of the rotatable nut module and the planetary roller arrangement.

3. The separable roller screw assembly according to claim 1, wherein both the first screw shaft and the second screw shaft are axially displaceable relative to the rotatable nut module and the planetary roller arrangement.

4. The separable roller screw assembly according to claim 3, wherein the first screw shaft and the second screw shaft are axially displaceable relative to the rotatable nut module at least until the first shaft and said second shaft are separated from the rotatable nut module and the planetary roller arrangement.

5. The separable roller screw assembly according to claim 1, wherein the second screw shaft remains essentially axially non-displaceable relative to the rotatable nut module and the planetary roller arrangement.

6. The separable roller screw assembly according to claim 1, wherein the rotatable nut module comprises an internal surface adapted for engaging the first roller external thread region and the second roller external region of each of the multiple rotatable rollers.

7. The separable roller screw assembly according to claim 6, wherein the internal surface comprises an internal thread region adapted for engaging the first roller external thread region and the second roller external region of each of the multiple rotatable rollers.

8. The separable roller screw assembly according to claim 6, wherein said internal surface is an essentially flat surface adapted for engaging the crest of the first roller external thread region and the second roller external region of each of the multiple rotatable rollers.

9. The separable roller screw assembly according to claim 1, wherein said rotatable nut module is configured for maintaining the planetary roller arrangement, the first screw shaft and the second screw shaft in the axially fixed configuration by a locking mechanism configured to prevent the first screw shaft, the second screw shaft, the planetary roller arrangement and the rotatable nut module to rotate relative each other.

10. The separable roller screw assembly according to claim 9, wherein the first screw shaft and the second screw shaft comprises first rotational stop unit and second rotational stop unit, respectively, and the separable roller screw assembly further comprises a housing comprising a first recess and a second recess arranged on opposite sides of the housing, as seen in the axial direction, the first recess and the second recess accommodate the first rotation stop unit and the second rotational stop unit, respectively, whereby a locking arrangement is formed by the housing, the first rotational stop unit, the second rotational stop unit and the locking mechanism enabling the separable roller screw assembly to maintain the axially fixed configuration.

11. The separable roller screw assembly according to claim 9, wherein the locking mechanism is configured for enabling a release of the separable roller screw assembly from the axially fixed configuration.

12. The separable roller screw assembly according to claim 1, wherein the first roller external thread region and/or the second roller external thread region of each one of the multiple rollers extend along each one of the multiple rollers to form a continuous external thread section.

13. The separable roller screw assembly according to claim 6, wherein the internal surface of the rotatable nut module forms a continuous internal thread section.

14. A space craft release mechanism for separating a first space craft element from a second space craft element, the space craft release mechanism comprising a separable roller screw assembly comprising:

a first screw shaft comprising a first external thread, wherein the first screw shaft is axially separated from a second screw shaft comprising a second external thread;

a planetary roller arrangement comprising multiple rotatable rollers radially arrayed about the first screw shaft and the second screw shaft, wherein each of the multiple rollers is-encapsulated by a rotatable nut module, and wherein each one of the multiple rollers comprises a first roller external thread region and a second roller external thread region adapted to engage the first external thread and the second external thread, respectively, the rotatable nut module is-coaxially arranged about the first screw shaft and the second screw shaft and configured for maintaining the planetary roller arrangement, the first screw shaft and the second screw shaft in an axially fixed configuration to permit the separable roller screw assembly to carry a load in an axial direction corresponding to an axial tensile force, while enabling displacement of the first screw shaft relative to the second screw shaft when the separable roller screw assembly is released from the axially fixed configuration; and wherein, when the-separable roller screw assembly is released from the-axially fixed configuration and subjected to the-axial tensile force, the first screw shaft is permitted to displace axially from the second screw shaft via rotation of the planetary roller arrangement about the first screw shaft and the second screw shaft.

15. The space craft release mechanism according to claim 14, further adapted to connect to the first space craft element and the second space craft element, whereby, when the first screw shaft is axial displaced from the second screw shaft until the first screw shaft is separated from any one of the nut module and the planetary roller arrangement, the first space craft element is separated from the second space craft element.

16. The space craft release mechanism according to claim 15, wherein the first screw shaft is connectable to the first space craft element and the second screw shaft is connectable to the second space craft element.

17. A clamp band system for a load bearing interface assembly of a space craft comprising:
   a separable roller screw assembly comprising:
      a first screw shaft comprising a first external thread, wherein the first screw shaft is axially separated from a second screw shaft comprising a second external thread;
      a planetary roller arrangement comprising multiple rotatable rollers radially arrayed about the first screw shaft and the second screw shaft, wherein each of the multiple rollers is-encapsulated by a rotatable nut module, and wherein each one of the multiple rollers comprises a first roller external thread region and a second roller external thread region adapted to engage the first external thread and the second external thread, respectively, the rotatable nut module is-coaxially arranged about the first screw shaft and the second screw shaft and configured for maintaining the planetary roller arrangement, the first screw shaft and the second screw shaft in an axially fixed configuration to permit the separable roller screw assembly to carry a load in an axial direction corresponding to an axial tensile force, while enabling displacement of the first screw shaft relative to the second screw shaft when the separable roller screw assembly is released from the axially fixed configuration; and
      wherein, when the-separable roller screw assembly is released from the-axially fixed configuration and subjected to the-axial tensile force, the first screw shaft is permitted to displace axially from the second screw shaft via rotation of the planetary roller arrangement about the first screw shaft and the second screw shaft.

18. The clamp band system according to claim 17, comprising a clamp band structure comprising a first end part connected to a second end part via the separable roller screw assembly, wherein the first end part is expanded from the second end part when the first screw shaft of the separable roller screw assembly is axially displaced from the second screw shaft of the separable roller screw assembly.

19. A load bearing interface assembly comprising:
   a clamp band system for a load bearing interface assembly of a space craft, wherein the claim band system comprises:
      a separable roller screw assembly comprising:
         a first screw shaft comprising a first external thread, wherein the first screw shaft is axially separated from a second screw shaft comprising a second external thread;
         a planetary roller arrangement comprising multiple rotatable rollers radially arrayed about the first screw shaft and the second screw shaft, wherein each of the multiple rollers is-encapsulated by a rotatable nut module, and wherein each one of the multiple rollers comprises a first roller external thread region and a second roller external thread region adapted to engage the first external thread and the second external thread, respectively, the rotatable nut module is-coaxially arranged about the first screw shaft and the second screw shaft and configured for maintaining the planetary roller arrangement, the first screw shaft and the second screw shaft in an axially fixed configuration to permit the separable roller screw assembly to carry a load in an axial direction corresponding to an axial tensile force, while enabling displacement of the first screw shaft relative to the second screw shaft when the separable roller screw assembly is released from the axially fixed configuration; and
         wherein, when the-separable roller screw assembly is released from the-axially fixed configuration and subjected to the-axial tensile force, the first screw shaft is permitted to displace axially from the second screw shaft via rotation of the planetary roller arrangement about the first screw shaft and the second screw shaft; and
      wherein the load bearing interface assembly is arranged between a first space craft element and a second space craft element.

20. The load bearing interface assembly according to claim 19, wherein the clamp band system is arranged to extend about the load bearing interface assembly.

* * * * *